| INDICATING REGISTER | D10 | D9 | D8 | D7 | D6 | D5 | D4 | D3 | D2 | D1 |
|---|---|---|---|---|---|---|---|---|---|---|
| POSITION INDICATED | 9 | 8 | 7 | 6 | 5 | 4 | 3 | 2 | 1 | 0 |
| STATE OF COUNTER | 1 | 2 | 3 | 4 | 5 | 6 | 7 | 8 | 9 | 0 |

FIG. 22

| CONTENT OF CONTROL REGISTER (STEP) | ADDITION -SUBTRACTION | MULTIPLICATION MULTI-ADD MULTI-SUB | DIVISION | REMARKS |
|---|---|---|---|---|
| CR = 0 | COMPLETION OF CALCULATION & TRANSFER OF NUMBER IN INDICATING REG. TO ACC. | | | |
| CR = 1 | SET NUMBER | | | |
| CR = 2 | DECIMAL POINT TREATMENT AND ASSOCIATING FIGURE. | | | |
| CR = 3 | NO | SEPARATION OF MULTIPLIER AND MULTIPLICAND | SHIFT OF DIVISOR OR DIVIDEND | |
| CR = 4 | ADDITION OR SUBTRACTION | | | (ACC)± (IND. REG.) |
| CR = 5 | NO | DISCRIMINATION | ADD 1 TO LSD OF ACC | |
| CR = 6 | NO | LEFT SHIFT OF MULTIPLICAND | LEFT SHIFT OF ACC | |
| CR = 7 | TRANSFER CALCULATING RESULT IN ACC TO IND. REG. | | | |

FIG. 23

ADDITION EXAMPLE 1 123.4+9.567=132.967

| ORDER | KEY (2-1) (2-2) | INDICATING REG. R(3-1) | C1(4-5) | ACC(3-2) | C3(4-7) | CR(4-4) |
|---|---|---|---|---|---|---|
| NO. 1 | | 0 0 0 0 0 0 1 2 3 4 | 9 | 0 0 0 0 0 0 0 0 0 0 | 0 | 0 |
| 2 | 9 | 0 0 1 2 3 | 0 | 4 0 0 | 1 | 0 |
| 3 | | 0 0 0 9 | 0 | 0 1 2 3 4 | 1 | 1 |
| 4 | • | 0 0 0 9 | 0 | 0 1 2 3 4 | 1 | 1 |
| 5 | 5 | 0 0 9 5 | 9 | 0 1 2 3 4 | 0 | 1 |
| 6 | 6 | 0 0 9 5 6 | 8 | 0 1 2 3 4 0 | 0 | 1 |
| 7 | 7 | 0 0 9 5 6 7 | 7 | 0 1 2 3 4 0 0 | 0 | 1 |
| 8 | +.= | 0 0 9 5 6 7 | 7 | 0 1 2 3 4 0 0 | 0 | 2 |
| 9 | | 0 0 9 5 6 7 | 7 | 0 0 0 0 1 3 2 9 6 7 | 0 | 4 |
| 10 | | 0 0 0 0 1 3 2 9 6 7 | 7 | 0 0 0 0 0 0 0 0 0 0 | 0 | 7 |
| 11 | | 0 0 0 0 1 3 2 9 6 7 | 7 | 0 0 0 0 | 0 | 0 |

ADDITION EXAMPLE 2 123.4+95=218.4

| ORDER | KEY (2-1) (2-2) | INDICATING REG. R(3-1) | C1(4-5) | ACC(3-2) | C3(4-7) | CR(4-4) |
|---|---|---|---|---|---|---|
| NO. 1 | | 0 1 2 3 4 | 9 | 0 0 0 0 0 0 0 0 0 0 | 0 | 0 |
| 2 | 9 | 0 1 2 3 | 0 | 4 0 | 1 | 0 |
| 3 | | 0 9 | 0 | 0 1 2 3 4 | 1 | 1 |
| 4 | 5 | 0 9 5 | 0 | 0 1 2 3 4 | 1 | 1 |
| 5 | + = | 5 0 9 | 1 | 0 1 2 3 4 | 2 | 2 |
| 6 | | 0 9 5 0 | 9 | 0 1 2 3 4 | 0 | 2 |
| 7 | | 0 9 5 0 | 9 | 0 2 1 8 4 | 0 | 4 |
| 8 | | 0 2 1 8 4 | 9 | 0 0 | 0 | 7 |
| 9 | | 0 2 1 8 4 | 9 | 0 0 | 0 | 0 |

FIG. 24

MULTI-ADD EXAMPLE 3.45+2.35x12.4 =32.590

| ORDER | KEY (2-1) (2-2) | INDICATING REG. R(3-1) | C1(4-5) | ACCUMULATOR ACC(3-2) | C3(4-7) | C2(4-6) | CR(4-4) |
|---|---|---|---|---|---|---|---|
| NO. 1 | | 0000000345 | 0 | 0000000000 | 0 | 0 | 0 |
| 2 | 2 | 0  0 | 0 | 0  0345 | 2 | 0 | 0 |
| 3 | | 2 | 0 | 345 | 2 | 0 | 1 |
| 4 | . | 2 | 0 | 345 | 2 | 0 | 1 |
| 5 | 3 | 23 | 9 | 345 | 1 | 0 | 1 |
| 6 | 5 | 235 | 8 | 345 | 0 | 0 | 1 |
| 7 | X | 235 | 8 | 345 | 0 | 0 | 1 |
| 8 | 1 | 235$^x$1 | 8 | 345 | 0 | 9 | 1 |
| 9 | 2 | 235$^x$12 | 8 | 345 | 0 | 8 | 1 |
| 10 | . | 235$^x$12 | 8 | 345 | 0 | 8 | 1 |
| 11 | 4 | 235$^x$124 | 7 | 3450 | 0 | 7 | 1 |
| 12 | +·= | 235$^x$124 | 7 | 3450 | 0 | 7 | 2 |
| 13 | | 124  235 | | 3450 | 3 | 0 | 3 |
| 14 | | 124  235 | | 3450 | 3 | 0 | 5 |
| 15 | | 235124 | | 3450 | 0 | 7 | 5 |
| 16 | | 3  23512 | | 3450 | 1 | 8 | 5 |
| 17 | | 123  235 | | 3450 | 3 | 0 | 5 |
| 18 | | 235123 | | 3685000 | 0 | 7 | 4 |
| 19 | | 122  235 | | 3685 | 3 | 0 | 5 |
| 20 | | 120  235 | | 4390 | 3 | 0 | 5 |
| 21 | | 235120 | | 4390 | 0 | 7 | 6 |
| 22 | | 12  2350 | | 4390 | 2 | 9 | 6 |
| 23 | | 12  2350 | | 4390 | 2 | 9 | 5 |
| 24 | | 0  235000 | | 32590 | 0 | 7 | 6 |
| 25 | | 0  235000 | | 32590 | 0 | 7 | 5 |
| 26 | | 235 | | 32590 | 3 | 7 | 7 |
| 27 | | 32590 | 7 | 235 | 0 | 0 | 0 |

FIG. 25

DIVISION EXAMPLE 0.166÷3.3=0.0503030

| ORDER | KEY (2-1) (2-2) | INDICATING REG. R(3-1) | C1(4-5) | ACCUMULATOR ACC(3-2) | C3(4-7) | CR(4-4) |
|---|---|---|---|---|---|---|
| NO. 1 | | 0000000166 | 7 | 0000000000 | 0 | 1 |
| 2 | ÷ | 01660 0 | 1 | 0 0 | 0 | 3 |
| 3 | | 01660 0 | 1 | 0 0 | 0 | 0 |
| 4 | 3 | 00 0 | 0 | 01660 0 | 9 | 1 |
| 5 | | 0 3 | 0 | 01660 0 | 9 | 1 |
| 6 | · | 0 3 | 0 | 01660 0 | 9 | 1 |
| 7 | 3 | 0 33 | 9 | 01660 0 | 8 | 1 |
| 8 | += | 0330 0 | 2 | 01660 0 | 1 | 3 |
| 9 | | 0330 0 | 0 | 01660 0 | 1 | 3 |
| 10 | | 0330 0 | 9 | 01660 0 | 0 | 2 |
| 11 | | 0330 0 | 9 | 98360 0 | 0 | 4 |
| 12 | | 00330 0 | 0 | 098360 0 | 1 | 4 |
| 13 | | 0330 0 | 9 | 01660 0 | 0 | 4 |
| 14 | | 0330 0 | 8 | 1660 00 [Q.] | 9 | 6 |
| 15 | | 0330 0 | 8 | 1330 00 | 9 | 4 |
| 16 | | 0330 0 | 8 | 1330 01 | 9 | 5 |
| 17 | | 0330 0 | 8 | 0010 05 | 9 | 5 |
| 18 | | 0330 0 | 8 | 9680 05 | 9 | 4 |
| 19 | | 0330 0 | 4 | 0010 050303 [Q.] | 5 | 4 |
| 20 | | 0330 0 | 3 | 010 0503030 [QUOTIENT] | 4 | 6 |
| 21 | | 0330 0 | 3 | 977 0503030 [Q.] | 4 | 4 |
| 22 | | 00 033 | 0 | 050303 0977 [Q.] | 1 | 4 |
| 23 | | 0330 0 | 3 | 0 1 0 0503030 [REM.] [Q.] | 4 | 4 |
| 24 | | 0503030033 | 0 | 0000000 10 [REM.] | 1 | 7 |
| 25 | | 0000503030 | 3 | 0 1 0 0000000 0 | 3 | 7 |

REMAINDER 0 0

United States Patent Office 3,548,179
Patented Dec. 15, 1970

3,548,179
MINIATURE DESK COMPUTER
Takehiko Kimura, Tokyo, and Yoshiaki Niizawa, Kawasaki-shi, Japan, assignors to Canon Camera Kabushiki Kaisha, Tokyo, Japan, a corporation of Japan
Filed May 3, 1967, Ser. No. 635,816
Claims priority, application Japan, May 6, 1966, 41/28,546
Int. Cl. G06f 7/38, 9/14, 3/14
U.S. Cl. 235—156 16 Claims

ABSTRACT OF THE DISCLOSURE

This invention relates to a miniature computer using binary coded decimal digits and including two computing shift registers having the same number of figures and serving as a memory, one of which being an indicating register and the other being an accumulator, and a plurality of computing counters. When computing is made, two or three of said counters are operated relatively to said shift registers for operating four fundamental rules of arithmetic and other mixed calculations by an automatic decimal point processing.

This invention relates to an electronic computer, and more particularly, to a miniature electronic computer devised for a desk type calculator.

There have hitherto been proposed various kinds of computers, but in the conventional computers, when the calculation of multiplication or division is carried out, it is necessary to use three registers or one double length register and one ordinary register, and thus the conventional computers have the drawbacks that the devices are complicated and are of large size.

An object of the invention is to provide a miniature desk computer overcoming above mentioned drawbacks.

Another object of the invention is to provide a miniature computer using two shift registers having the same number of figures and serving as a memory and one of which being an indicating register and the other being an accumulator, and a plurality of calculating registers for simply operating four fundamental rules of arithmetic and other mixed calculations.

Further object of the invention is to provide a miniature computer including two computing shift registers having the same number of figures and serving as a memory, one of which being an indicating register and the other being an accumulator, and a plurality of counters operating reactively to said two shift registers for operating four fundamental rules of arithmetic and other mixed calculations by an automatic decimal point processing.

Further object of the invention is to provide a miniature computer comprising above mentioned structure, and being able to operate addition-subtraction with or without decimal point, complement conversion, multiplication (usual and with automatic decimal point), multiplication of a predetermined digit, automatic clear multiplication, multiplication-addition, multiplication-subtraction (with or without decimal point), division and endless quotient division.

The foregoing and other objects and features of the invention will be described more in detail hereinafter.

(1) Addition-subtraction (a) Addition-subtraction of the numbers having decimal point:

Generally speaking, in order to carry out the addition and the subtraction of two numbers, the number to be added and the number to add are set in the respective registers, and it is necessary to carry out the calculation by associating the decimal points of said two numbers.

For example, the number to be added is presumed to be A.*a* and the number to add is presumed to be B.*b* (wherein A and B are the numbers for calculation above the decimal points, and *a* and *b* are the numbers for calculation below the decimal points; [A] and [B] are presumed to be the number of figures above the decimal points, and [*a*] and [*b*] are presumed to be the number of figures below the decimal points), and the explanations are given hereinafter in the case of the addition of (*A.a*+*B.b*).

First of all, the number to be added (augend) (A.*a*) is set in the accumulator, and the number to add (addend) (B.*b*) is set in the indicating register, wherein augend (A.*a*) and addend (B.*b*) are set from the right end of the accumulator and the indicating register, respectively. In this case, when [*a*] is equal to [*b*], the positions of the decimal points of augend and addend are agreed and therefore it is possible to carry out the calculation in the state wherein the numbers are being set.

However, in case [*a*] is not equal to [*b*], i.e., in case [*a*] is larger than [*b*], and in case [*a*] is smaller than [*b*], the augend and addend are respectively figure-transferred to have the positions of the decimal points agree, and thereafter addition must be carried out.

The following are the methods for having the decimal points agreed by means of the electronic computer of the present invention.

(1) In case $[a] \geqq [b]$:

Namely, when the number of figures [*a*] below the decimal point is larger or is equal to the number of figures [*b*] below the decimal point, the number to be added (A.*a*) is set in the indicating register, and at the same time the number of figures [*a*] below the decimal point is counted by the decimal point counter, and it is memorized in the same counter. Next in order to set the most significant figure of the addend, the number key is pushed, and at this time the number to be added (A.*a*) is transferred from the indicating register to the accumulator, and the number of figures [*a*] below the decimal point is transferred from the decimal point counter to the auxiliary counter, and thereafter the most significant figure of the number to add (B.*b*) is set in the indicating register. Thereafter, the number B for calculation above the decimal point of the number to add (B.*b*) is orderly set.

In this state, A.*a* is set in the accumulator and B is set in the indicating register, and the decimal point counter memorizes 0, and the auxiliary counter memorizes the number of figures [*a*].

Thereafter, the decimal point of the number to add (B.*b*) is set, and as the number (*b*) below the decimal point is set, the decimal point counter counts the number of figures below decimal point of the number to add (B.*b*) and the auxiliary counter gradually subtracts the number of figures below the decimal point of the number to add (B.*b*) from [*a*], and as the result thereof, all the figures of the number to add (B.*b*) are set in the indicating register, and in this state, the decimal point counter memorizes the number of figures below the decimal point [*b*] of the number to add (B.*b*) and the auxiliary counter memorizes $[a]-[b]$. This is the case where $[a] \geqq [b]$ and therefore the contents of the auxiliary counter ($[\beta]$) is $[\beta]=[a]-[b] \geqq 0$.

Next, when the addition order key is pushed, the association of the decimal points is started.

First of all, it is judged whether or not the contents ($[\beta]$) of the auxiliary counter is 0, and if it is not 0, the number to add (B.*b*) set in the indicating register is left-shifted, and at the same time the shift is counted by the decimal point counter and reversely by the auxiliary counter. In this case, during the time when the contents (B.$b$) of the indicating register is shifted and makes one round, the contents [$\beta$] of the auxiliary counter has the chance to become 0. When the contents [$\beta$] become 0, the positions of the decimal points of the number to be added (A.$a$) set in the accumulator and of the number to add (B.$b$) set in the indicating register, are agreed. Therefore, when the contents [$\beta$] of the auxiliary counter become 0, the shift operation is stopped, and the operation for having the decimal points agreed is completed.

At this state, the number to add (B.$b$) set in the indicating register is in the state wherein it is shifted by the figures of [$\beta$] to the left, and the decimal counter memorizes [$b$]+[$\beta$], and the auxiliary counter is in the state of 0.

Next, the operation of addition of two numbers is carried out. The accumulator has the function of a register and the function of addition, and therefore, the number memorized in the accumulator and the number set in the indicating register are added thereby, and the result thereof is memorized in the accumulator, and therefore in the cycle of addition caused by the pushing down of the addition order key, the operation of the addition of the contents (A.$a$) of the accumulator and the contents (B.$b$) of the indicating register is carried out, and as the result thereof $A.a+B.b$ is memorized in the accumulator to complete the addition. After the completion of addition, the answer ($A.a+B.b$) in the accumulator is transferred into the indicating register from the accumulator, and thus the calculation is completed.

(2) In the case of [$a$]<[$b$]:

In other words, when the number of figures below the decimal point [$b$] of the number to add (B.$b$) is larger than the number of figures below the decimal point [$a$] of the number to be added (A.$a$), and when it is presumed that the number to be added (A.$a$) and the number to add (B.$b$) are in the same relation as in the case [$a$]≧[$b$], the operations of before the setting of the number below the decimal point of the number to add (B.$b$) are exactly the same as aforementioned. In other words, when the above mentioned operations are finished, the number to be added (A.$a$) has been set in the accumulator, and in the indicating register the number for calculation (B) above the decimal point of the number to add (B.$b$) has been set the decimal point counter has memorized 0, and the auxiliary counter has memorized the number of figures [$a$] below the decimal point of the number to be added (addend) (A.$a$).

Next, by means of the same operation as in the foregoing case, the number below the decimal point of the addend (B.$b$) is set and in the process of the setting up of the number to add, the contents of the auxiliary counter become 0 when the number below the decimal point of the addend (B.$b$) is set on a certain figure [$\alpha$], where [$\alpha$] is smaller than [$b$], since [$a$]<[$b$].

In this case the contents of the decimal point counter are [$a$]=[$b$]−[$\alpha$] and in the indicating register, ($B.b-\alpha$) of the addend (B.$b$) is set. Thereafter, the number below ($b-\alpha$) of the addend (B.$b$) is set in the indicating register, and at the same time the number to be added (A.$a$) set in the accumulator is gradually left-shifted. By so doing, in the number setting process of the number to add thereafter, the number to be added within the indicating register and the number to add within the accumulator are left-shifted simultaneously along with the setting of numbers such that the positions of the decimal points are agreed. Consequently, when the number to add (B.$b$) is completely set, the positions of the decimal points of the number to be added (A.$a$) and the number to add (B.$b$) remain agreed. After the contents of the auxiliary counter become 0, it is left to be unoperated, but the decimal point counter is kept operated to count the number of figures below the decimal point of the number to add (B.$b$) synchronously along with the set number even after the auxiliary counter become 0.

After the numbers are set as mentioned above, the numbers enter the addition cycle, and in case [$a$] is smaller than [$b$], the contents of the auxiliary counter, i.e., 0 is detected even if the addition order comes, and therefore it is not necessary to carry out the treatment to adjust the decimal points, and the numbers directly enter the addition cycle.

The following calculating operations are carried out in the same manner as in the case of [$a$]≧[$b$].

The above are the explanations of the addition operation, and in the case of subtraction, the accumulator is operated as the subtracter in the subtracting cycle, and other calculating operations are carried out in the same manner as in the case of addition.

($b$) Addition-subtraction of numbers having no decimal point:

The addition-subtraction of two numbers having no decimal point does not require the association of the decimal points, and therefore the calculation operation except for the operation for associating the decimal points can be carried out in the calculating operation of the addition-subtraction of the numbers having decimal points.

In other words, the two numbers to be subjected to the addition-subtraction are respectively presumed to be A and B, and when the addition of $A+B$ is carried out, the number to be added (A) is set in the indicating register. Next, the number to add (B) is set in the indicating register, and at the same time, the number to be added (A) which has been set in the indicating register, is transferred to the accumulator, and thereafter in the addition cycle, the number to add (B) within the indicating register is added to the number to be added (A) within the accumulator, and as a result thereof ($A+B$) is memorized in the accumulator, and then the answer ($A+B$) which was memorized in the accumulator is transferred to the indicating register, and the operation of calculation is completed.

In the case of subtraction, the same operation is carried out except for the point that the accumulator is operated as the subtractor in the subtracting cycle.

(2) Complement number conversion

There are a number of methods for indicating negative numbers, and one of the methods is indication by means of complement numbers. In accordance with this method, when addition-subtraction is carried out repeatedly, if the carry operation of the most significant figure is ignored, it is possible to carry out addition-subtraction, and therefore the planning of the calculation circuit can be easily carried out, which is accounted to be the advantage of this method.

However, when the result of calculation is in the negative it is indicated by a complement number, and therefore when calculation is carried out continuously, there is no problem, but in case it is intended to read the subtotal, the complemented number must be indicated by means of some method, and it is preferable to carry out the operation by one touch system.

In the calculator wherein the decimal system is used, the complement of the number 4 is 6, indicating that the number is −4.

Therefore, the method for converting complement into the complemented number becomes $\theta-6=4$ (1 borrow) and the figure borrow is ignored; thus the complement to be obtained from 0 can be deduced.

In the electronic computer of the present invention, as a result of the calculation, when it is presumed that a complement number (C) remains in the indicating register and some number remains in the accumulator, the conversion of the complement is carried out in accordance with the following method.

Firstly, when the subtraction key is touched, the addition-subtraction device of the accumulator is to be set to operate as a subtraction device. At the same time, the number remaining in the accumulator is clear to be 0, and general subtraction is carried out, i.e. from the content of the accumulator the content of the indicating register is subtracted. In this case, the minuend is made 0 and from which the complement number (C) is reduced to the result that the complemented number remains in the accumulator. Thereafter this number is transferred to the indicating register which shows the complemented number.

Accordingly, the conversion of the complement (C) into the complemented number is carried out, and if necessary, the subtraction order key is again touched to convert the complemented number into the complement (C).

(3) Multiplication

In accordance with the conventional method for multiplication in the conventional electronic computers, the multiplicand and the multiplier are set respectively in independent registers, and the result of calculation, i.e., the product is indicated on the two registers, i.e., the register where the multiplier or the multiplicand is set, and the other register. Therefore, it is necessary to provide another register for memorizing the multiplicand or the multiplier.

However, in the electronic computer of the present invention, two registers treat all the numbers of the multiplicand, the multiplier and the product, and the calculation is carried out in accordance with the following method.

(*a*) General multiplication and automatic decimal point multiplication

For example, the numbers of calculation, i.e., the multiplicand (A.*a*), the multiplier (B.*b*) and the product (C.*c*) are defined as follows;

Namely, among the multiplicand (A.*a*), the multiplier (B.*b*) and the product (C.*c*), A, B, and C are defined to be the multiplicand, the multiplier and the product above the decimal points, and *a*, *b*, and *c* are defined to be the multiplicand, the multiplier and the product below the decimal points, and they can be respectively shown as follows;

$A=A_N \cdot A_{N-1}$ -------------------------------- $A_2 \cdot A_1$
$\alpha=a_n \cdot a_{n-1}$ -------------------------------- $\alpha_2 \cdot a_1$
$B=B_M \cdot B_{M-1}$ -------------------------------- $B_2 \cdot B_1$
$b=b_m \cdot b_{m-1}$ -------------------------------- $b_2 \cdot b_1$
$C=C_L \cdot C_{L-1}$ -------------------------------- $C_2 \cdot C_1$
$C=C_1 \cdot C_{1-1}$ -------------------------------- $C_2 \cdot C_1$ On the other hand, the number of figures of the numbers above the decimal points of the multiplicand (A.*a*), the multiplier (B.*b*) and the product (C.*c*) are represented by [A], [B], and [C] and the number of figures of the numbers below the decimal point are respectively represented by [*a*], [*b*], and [*c*].

When the calculation which can be represented by the formula of $A.a \times B.b = C.c$ is carried out, the maximum number of figures of the product [C].[*c*] becomes $$[C].[c]=\{[A]+[B]\}.\{[a]+[b]\}$$

and therefore by making the number of figures of all the numbers to be treated become below $$[A]+[a]+[B]+[b]$$

it is possible to simultaneously indicate the multiplicand and the multiplier in one register as $[A].[a] \times [B].[b]$.

The multiplicand (A.*a*) and the multiplier (B.*b*) are set in the indicating register in a normal arrangement without intervals from the right end of the indicating register.

In this case, the number of the figures $[B]+[b]$ of the multiplier is counted by the figure counter, and the border between the multiplier set in the indicating register and the multiplicand (the number to be multiplied), i.e., the position of the mark × is indicated by the figure counter, and one register is used for two registers. And the number of figures below the decimal point of the product (C.*c*) is $[a]+[b]$, and therefore, in said number setting operation, the set number of the figures [*a*] below the decimal point of the number to be multiplied (A.*a*) and the set number of the figures [*b*] below the decimal point of multiplier (B.*b*) are counted by the decimal point counter, and the position of the decimal point of the product (C.*c*) is memorized.

Next, the multiplicand (A.*a*) and the multiplier (B.*b*), which are set in the indicating register, are right shifted till the contents of the figure counter, i.e., $[B]+[b]$, becomes 0.

When the figure counter becomes 0, if the shift is stopped, the multiplicand (A.*a*) is accumulated in such a state wherein the number of the least significant digit, i.e., $a_1$ is positioned at the right end of the indicating register, and the multiplier (B.*b*) is accumulated at the left side of the indicating register. On the other hand, in said shift operation, the contents of the figure counter, i.e., $$[B]+[b]$$

is transferred to another auxiliary counter.

In the above mentioned case, the decimal point counter is retained in such a state wherein $[a]+[b]$ is memorized.

After the above mentioned operation is completed, the multiplicand (A.*a*) within the indicating register is added by $b_1$ times, i.e., the number of the least significant figure of the multiplier, in the accumulator.

In accordance with the operation in this case, every time the multiplicand (A.*a*) is added, the number $b_1$ of the least significant figure of the multiplier (B.*b*) is forcibly reduced one by one, and when $b_1$ becomes equal to 0 the adding operation is stopped.

When the cycle of addition is completed, $(A.a) \times b_1$ is accumulated at the right end of the accumulator, and the multiplier (B.*b*) within the indicating register is changed into $(B.b-b_1)$.

Thus, the multiplication of one figure of the multiplier (B.*b*) is completed, and then the multiplicand (A.*a*) is left-shifted by one figure, and at the same time, one is reduced from the contents of the auxiliary counter, i.e. $[B]+[b]$. The multiplication of the second least significant figure of the multiplier (B.*b*) can be carried out as in the foregoing case.

Thereafter, the same operation is carried out till the contents of the auxiliary counter become 0. When the adding and shifting operations have been carried out, the product $A.a \times B.b$ is accumulated in the accumulator. The decimal point of the product is the contents counted by the decimal point counter at the time when the numbers are set, and it is at the position of the figure $[a]+[b]$ from the least significant figure. Last of all the product of the accumulating calculator is transferred to the indicating register, and is indicated, and thus the multiplying operation is completed.

The above are the explanations of automatic multiplication of the numbers having decimal points, but in the case of multiplication of numbers having no decimal points, the same operation is carried out except for the point that the operation to treat the decimal points is not required in the adding operation.

(b) Multiplication of a predetermined number:

At the time when multiplication is finished, multiplicand (A.*a*) has been transferred to the high figure (to the left side) by $[B]+[b]$, i.e., the number of figures of the multiplier (B.*b*) from the time when the multiplier was set.

When multiplication of the same number is carried out, 1 is subtracted from the auxiliary counter every time when one figure calculation is carried out in the multiplication process, and at the same time, 1 is added to the figure counter, and by so doing, it is possible to have the figure counter memorize the number of figures of the upward movement of the multiplicand (A.*a*) at the time when the calculation is completed. Therefore, at the time when calculation is completed, the multiplicand (A.*a*) is shifted to the lower figure (to the right) by the number of figures counted by figure counter, and it is turned back to the same position as that of the first number setting.

Thereafter, the predetermined number calling order is given and thereby multiplicand (A.*a*) having been transferred into the accumulator is transferred to the indicating register, and as a result thereof, the latter has the same state as when the multiplicand (A.*a*) which was used in the preceding calculation was set.

Therefore, the multiplier is set thereafter, and the multiplying operation is carried out as in the preceding case, and it is possible to carry out multiplication of the predetermined number according to which the number to be multiplied (A.*a*) is made the same.

(c) Automatic clear multiplication:

When multiplication is carried out in such a state wherein the result of calculation is retained in the indicating register, as the first figure of the multiplicand is set, the result of the preceding calculation is transferred to the accumulator from the indicating register, and therefore when the multiplication order key is pushed, or when the contents of the accumulator are cleared before the calculation is started, it is possible to carry out automatic clear multiplication.

Also, when calculation is carried out without a clearing operation, it is possible to carry out multiplication addition or multiplication subtraction as is described hereinafter.

(4) Multiplication-addition, multiplication-subtraction

In carrying out the calculation of multiplication-addition and multiplication-subtraction, the result of a certain calculation (C.*c*) having been beforehand set in the accumulator, is accumulated in accumulator, and the multiplicand (A.*a*) is added or subtracted by the number of figures of the multiplier (B.*b*), and therefore, the operation for associating the decimal points of the result of the calculation (C.*c*) and the decimal point of the product (A.*a*×B.*b*) must be carried out before the calculating operation. However, the operation for associating the decimal point of the result of the multiplication (A.*a*×B.*b*)

is carried out by the decimal point counter at the time when the number is set, and therefore the positions of the decimal points are associated between the position of the decimal point of the result of the multiplication (A.*a*×B.*b*)

i.e., [*a*]+[*b*] and the position [*c*] of the decimal point of the result of a certain calculation (C.*c*) in the accumulator.

The method for associating the decimal points is exactly the same as in the case of the association of the decimal points of the addition-subtraction having decimal points.

After the completion of the operation for associating the decimal points, the calculating process is carried out, and the multiplier (A.*a*) is added to or subtracted from the contents of the accumulator repeatedly.

(5) Division

In accordance with the method for carrying out division by the conventional electronic computers, the dividend is independently set in the first register, and the divisor is independently set in the second register, and the result of the calculation is indicated in the independent third register, and therefore three registers are required.

The division of the electronic computer of the present invention is carried out in such a manner that the divisor is subtracted from the dividend, and the frequency of the reduction is counted to obtain the quotient, and in carrying out the so-called dividing calculation, the register for recording the frequency of subtraction of the divisor from the dividend, is used also as the register wherein the dividend is set, and the frequency of the subtraction is recorded at the least significant figure of the dividend, and it is possible to carry out the calculation by two registers.

However, it is necessary that the dividend should be number whose figures are less than the figures of the register wherein the divisor is set, by at least two figures. and the number of the figures of the quotient which can be calculated, is the number of figures before the most significant figure of the quotient and the least significant figure of the divisor are overlaid in the subtracting operation.

The following are the explanations of the method of calculation in accordance with the present invention.

(a) General division:

First of all, the divisor (B) is set in the indicating register and the dividend (A) is set in the accumulator, and the dividend (A) and the divisor (B) are respectively shifted upward (to the left) up to the most significant figure less one, i.e., leaving vacant the most significant figure of the indicating register and the accumulator. Thereafter, the operation in which the divisor (B) is subtracted from the dividend (A) within the accumulator, is carried out, and every time said subtraction is carried out, 1, as quotient, is added to the least significant figure of the accumulator one by one, and in case the result of the subtraction is in the negative, the divisor is added to the dividend only reduced once, and at the same time 1 is reduced from the least significant quotient within the accumulator, and the remainder against the quotient at this time, i.e., the dividend in the next calculation, is shifted upward (to the left) by one figure, and the reduction against the figure of the next quotient is repeated. In the cycle of said reduction, every time the dividend is shifted by one figure, 1 is added to the auxiliary counter, and the number of the figures of the quotient at this point is memorized.

Thus, every time the repetition of the reduction in each figure is finished, the same operation is repeated over and over again till the most significant figure of the quotient and the least significant figure of the divisor are overlaid while observing the contents of the auxiliary counter (the number of figures of the quotient), and when the figures are overlaid, it is the time when the calculation is finished, and as a result thereof, the quotient (C) and the remainder (D) are accumulated in the accumulator.

In this case the number of figures of the quotient can be represented by the following formula:

The number of figures of the quotient=the number of figures of the accumulator—the number of the figures of the divisor −2.

Next, when the remainder (D) and the quotient (C) within the accumulator are transferred to the indicating register simultaneously, the quotient (C) and the remainder (D) are distinguished and indicated by the contents of the auxiliary counter.

In the said transferring operation, the divisor (B) in the indicating register is retained in the accumulator.

(b) Automatic division of numbers having decimal points:

In accordance with the electronic computer of the present invention, when division of numbers having decimal points such as *A.a* ÷ *B.b*, is carried out, the number of figures of the quotient is not determined in advance, and therefore, the position of the decimal point with respect to the result of the final calculation cannot be determined before the calculation is started. However, the position of the first figure of the quotient at the point when the calculation is started is determined to be at the least significant figure of the accumulator, and therefore the position of the decimal point can be determined against the most significant figure of the quotient before the calculation is started.

On the other hand, after the start of the calculation, the position of the decimal point against the most significant figure of the quotient is not changed and during the calculation, the quotient is calculated one figure after one figure, and every time left shifting is carried out, the position of the decimal point is left-shifted one figure after one figure, and thereby it is possible to obtain the correct position of the decimal point against the obtained quotient at the time when the calculation is terminated.

In other words, before the calculation is started, the position of the decimal point against the most significant figure of the quotient is determined, and thereafter, the position of the decimal point is carried up one figure after one figure along with the progress of the calculation, and when the calculation is terminated, the position of the decimal point against the quotient is determined.

Thus, before starting the calculation, the position of decimal point against the most significant figure is determined, and the division of numbers having decimal points is carried out, and the method therefor is explained hereinafter.

When the calculation of $A.a \div B.b$ is carried out, first of all, the dividend (A.$a$) is set in the indicating register, and the number of figures $[a]$ below the decimal point of the dividend (A.$a$) is counted by the decimal point counter.

Thereafter, by giving the division order, the dividend (A.$a$) is left-shifted up to the (the most significant figure less one) of the indicating register, and in this case, the number of shifted figures $[\alpha]$ is counted by the decimal point counter, and as a result thereof, after the termination of shifting, the decimal point counter is in the state wherein it has counted $[a]+[\alpha]$ figures. Next, when the number (B) above the decimal point of the divisor (B.$b$) is set, the dividend is transferred into the accumulator, and in this case, the contents of the decimal point counter are transferred to the auxiliary counter, in the relation of complement number against the number of the figures of the calculating register, and the decimal point counter is cleared.

In other words, in this case, the decimal point counter=0, and the auxiliary counter is in the state of $$([a]+[\alpha])$$

Thereafter, the decimal point key is pushed, and further the number ($b$) below the decimal point of the divisor (B.$b$) is set, and at the same time the decimal point counter and the auxiliary counter are operated to count.

As a result thereof, at the time when setting of numbers is terminated, the decimal point counter has already $[b]$, and the auxiliary counter has already counted $$-([a]+[\alpha])+[b]$$

Next, the calculation start order is issued, to shift the divisor (B.$b$) upward (to the left) up to the position leaving vacant the most significant figure of the indicating register.

In this case, the number of shifted figures $[\beta]$ is counted by the decimal point counter and auxiliary counter, and as a result thereof, at the time when said shifting operation is terminated, the decimal point counter becomes equal to the state of $[b]+[\beta]$, and the auxiliary counter becomes in the state of $-([a]+[\alpha])+([b]+[\beta])$, and on the other hand, the respective counters are constituted so as to be circulated based on the number of the same number of figures as that of the accumulator and the indicating register, therefore $$[a]+[\alpha]=-(A+1)$$

$$[b]+[\beta]=-(B+1)$$

Therefore, the contents of the auxiliary counter, i.e., $-([a]+[\alpha])+([b]+[\beta])$ becomes equal to $[A]-[B]$.

Here, $[A]-[B]$ determines the position of the decimal point of the quotient, and it corresponds to the number of figures for lowering the position of the decimal point to the lower figures (to the right) from the most significant figure of the quotient calculated in the accumulator.

Therefore, by means of the decimal point treating operation, the contents of the auxiliary counter, i.e., $[A]-[B]$ is transferred to the decimal point counter, and thereby the position of the decimal point against the most significant figure of the quotient, is determined.

Thus, in the same manner as in the case of general division, during the calculation, it is possible to simply carry out the automatic division of numbers having decimal points by shifting the position of the decimal points along with the quotient.

(c) Endless quotient division:

After the completion of the calculation for division, the quotient (C) which is indicated in the indicating register, is cleared, and the remainder (D) is transferred to the accumulator, and the divisor (B) is turned back again to the indicating register and the remainder (D) is treated as the new dividend, and the calculation is repeated over and over again, and by continuing the new quotient after the quotient (C) obtained by the preceding calculation, it is possible to obtain the endless quotient.

Next, the construction and the effect of the electronic computer of the present invention, are explained in the following.

Each figure of the electronic computer of the present invention is composed of 4 bits. The computer employs the binary coded decimal system of 8.4.2.1 and the respective bits within one word are series constituted. The number of figures which constitutes one word is optional but the following explanation is made based on the presumption that one word is composed of 10 figures.

The memory means of the numbers and order register, and the means such as the counters, employ flipflops (hereinafter simplified as FF) such as those employing transistors, and the computer of the present invention is a synchronous system wherein the set and reset are carried out in synchronous relation with clock pulses. The number and the counting order accompanying the calculation are given by the external key board, and the result of the calculation is indicated by external indicating means.

Of course, the number and calculation order, or the indication of the result of calculation or the like are not restricted to the above mentioned, but it can be made by introducing input by means of program tape or other programming means, and extracting output by type out or tape punch or the like.

Other objects and features of the invention and the calculation using the inventive computer will be explained more in detail referring to an illustrative embodiment shown in the attached drawings in which:

FIG. 22 shows the control-order at the time when calculation is carried out; and FIG. 23 through FIG. 25 show examples of the order of the operations of the embodiments of the present invention.

Figure 1:
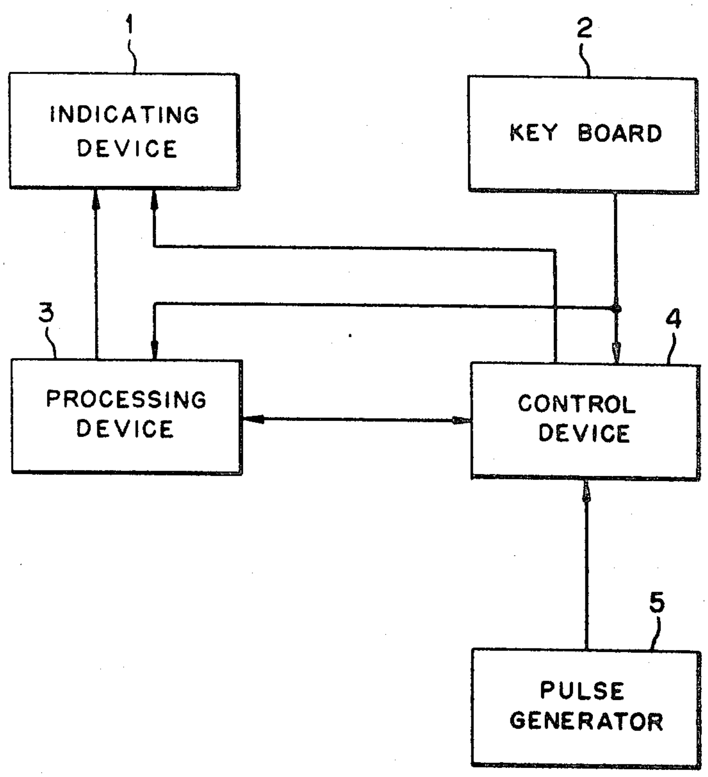
FIG. 1 is a block diagram showing the outline of the computer of the present invention.

Referring to the drawings, FIG. 1 is a block diagram of the whole system of the invention. The indication device 1 comprises a converter for converting binary coded decimal system numbers into decimal system numbers, number indicating means for indicating thus converted decimal system numbers, decimal point indicating means and symbol indicating means for indicating the decimal point and the position of the symbol, respectively. The indicating device 1 may be of a type similar to that described in French Pat. No. 1,350,840 issued to Association des Ouvriers en Instruments de Precision. In the apparatus of this patent, the content of each register is indicated in a corresponding indicating device in accordance with the operation of gates.

The key board 2 is composed of the various kinds of keys for giving the numbers and orders to the computers in carrying out the calculations. It includes 10 number keys from 0 to 9, and a decimal point key, and it is therefore composed of these 11 keys and the various kinds of calculation order keys.

The calculation means 3 or processing device, which memorizes numbers and carries out calculation steps, comprises an indicating register and an accumulator together with addition-subtraction means, as will be explained in conjunction with FIG. 2A.

The control device 4 is the means for controlling the calculating means and controls the transferring of numbers and calculation, and at the same time, it is connected to the indicating device for indicating the decimal point and the position of symbols. The pulse generator 5 is the means for generating the synchronous pulses such as clock pulses, timing pulses, digit pulses, shift pulses or the like.

Figure 2A:
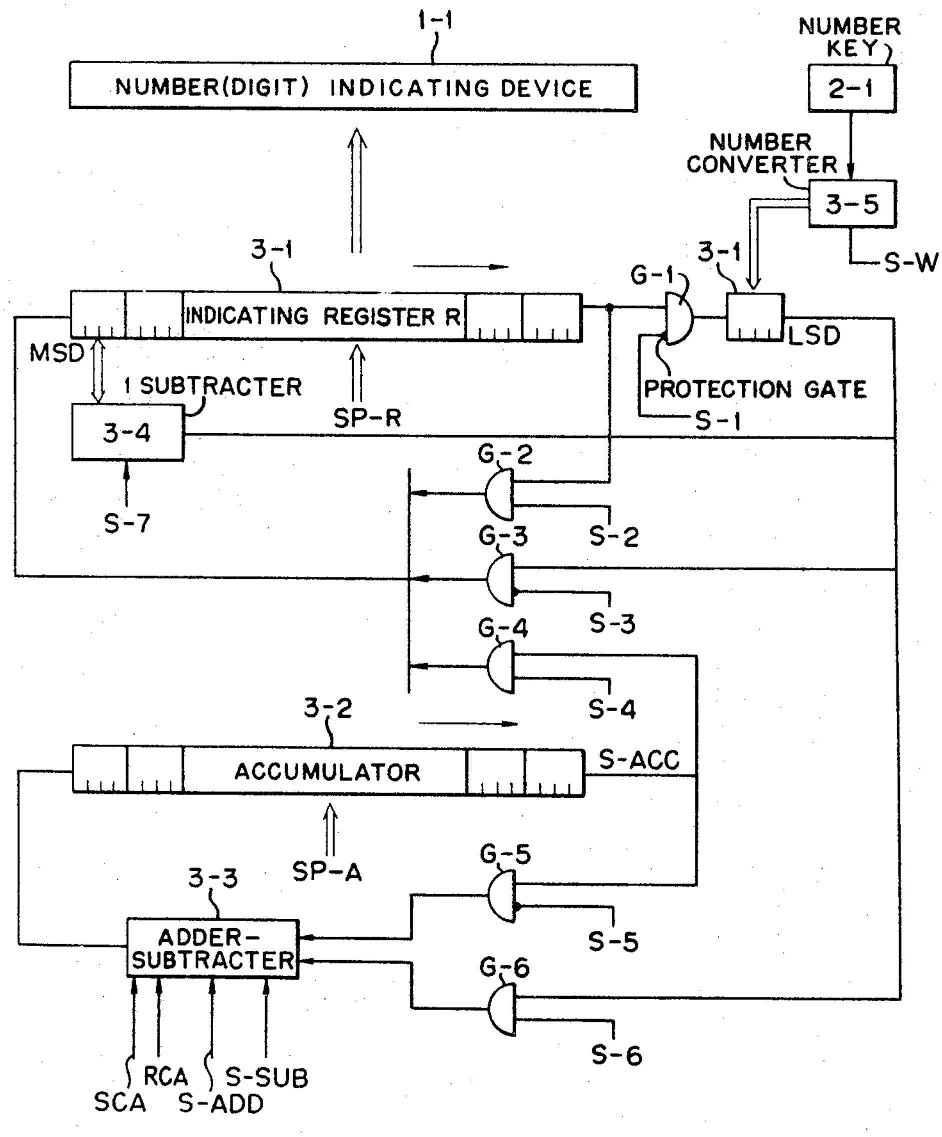
FIG. 2A is a block diagram showing the calculation means of the computer.

FIG. 2A shows the block diagram of the calculating portion of the system.

Figure 4:
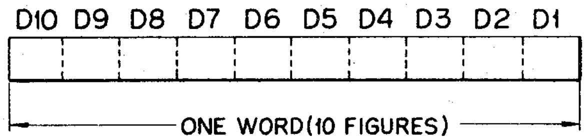
FIG. 4 and FIG. 5 show the arrangement of the number within the indicating register and accumulator.
Figure 6:
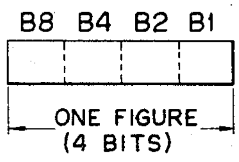
FIG. 6 is a diagram showing the constitution of bits of the numbers of one figure within the indicating register and the accumulator.

The indicating register 3–1 is a shift register, wherein as is shown in FIG. 6 and FIG. 4, each decimal system figure or digit is constituted of 4 bits, and 10 figures are made into one word, and comprises flipflops connected serially from the most significant bit to the least significant bit. The shift pulse into the register is indicated as SP–R and is simultaneously given to all the flipflops so that the shift of numbers can be carried out.

Figure 5:
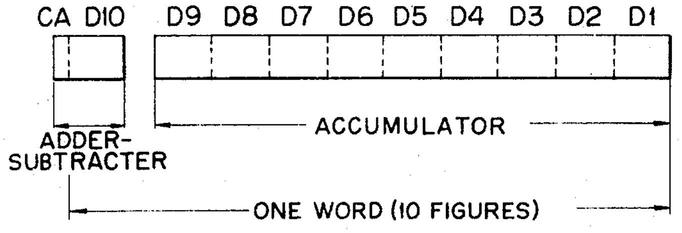

The accumulator 3–2 is similar to the indicating register, but, as is shown in FIG. 5, memorizes 9 figures. The tenth figure, the most significant digit is constituted by using one digit of the adder-subtracter. The shift pulse to the adder-subtracter 3—3 and the accumulator 3–2 is indicated as SP–A in the diagram of FIG. 2A.

Figure 7:
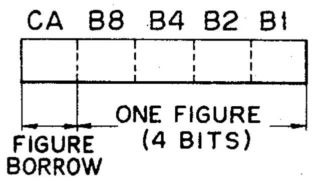
FIG. 7 is a diagram showing the constitution of bits within the adder-subtractor attached to the accumulator.

The adder-subtracter 3—3 carries out the addition and subtraction. As is shown in FIG. 7, the adder-subtracter is composed of 5 bits, namely, one figure of 4 bits and 1 bit for memorizing CA, i.e., the carry-up or borrow to the next bit and as is mentioned above, corresponds to the most significant digit of the accumulator. In accordance with the adder-subtracter, either of the adding signal S–ADD or the subtracting signal S–SUB is always given, and in the case of the adding signal S–ADD=1, operates as the decimal adder of 8.4.2.1 code and in the case of the subtract signal S–SUB=1, operates as the subtracter. Therefore, between the two signals, there is the relation that S–ADD is equal to $\overline{\text{S–SUB}}$. The signal SCA sets CA, and the signal RCA is the signal for resetting CA.

The numbers, as is indicated by the horizontal arrows in FIG. 2A, are shifted from the higher order to the lower order, and G–1, G–2 . . . G–6 are the gates for controlling the transfer of the numbers, and the opening and the closing of said gates can be carried out by the signals S–1, S–2 . . . S–6, respectively.

The number converter 3–5 converts the decimal system number coming from the number key 2–1 into 8.4.2.1 code, and at the same time sets the numbers, when its gate is opened by the signal S–W, by sending signals to the least significant digit LSD of the indicating register 3–1.

One (1) subtracter 3–4 constitutes the circuit which works to subtract 1 from the most significant digit of the indicating register 3–1 when the signal S–7 is sent, and when the signal S–7 is not sent, the FF of the most significant figure of the indicating register becomes merely part of the shift register.

The computer of the present invention is a 10 key system having 10 numbers from 0 to 9, and therefore the numbers sent from the key are sent from the higher figure gradually. In the process for setting the numbers, the gate G–1 and the gate G–3 are opened, and when the number key is touched, the number set in the indicating register is shifted by the number of the figures which is smaller by one than the number of the figures set in the indicating register, and thereafter, the signal S–W is applied, opening the gate of the number converter, and the number from the key is set on the least significant figure of the indicating register.

The computer of the present invention is composed of 10 figures and one figure is composed of 4 bits, and therefore when the shift pulse SP–R of the indicating register is applied to the indicating register 36 times, i.e., $$[(10-1)\times 4=36]$$

the number in the register is shifted to the right by 9 figures, and as the result thereof, it is shifted to the left by one figure. Thereafter the number of the key touched is set on the least significant figure, and therefore by repeating such an operation as mentioned above, the number is set on the indicating register from the higher figures. The indicating register is connected to the indicating means and therefore it is possible to observe whether or not the set number is correct. At the time when the calculation is finished, as in the case of ordinary computers, in the computer of the present invention the result of the calculation is within the accumulator, and therefore the gates G–1, G–4, and G–6 are opened, and the gates G–2, G–3 are closed, and when the shift pulse SP–R and the shift pulse SP–A are simultaneously applied to the two registers 40 times corresponding to 10 figures, the result of the calculation within the accumulator is transferred to the indicating register to indicate it.

In carrying out the calculation, the gates G–1, G–5, G–6 are opened, and the control signal S–ADD or S–SUB is applied to the adder-subtracter, and 40 shift pulses are simultaneously added to the two registers, and the subtraction of the indicating register from the accumulator is carried out or the addition of the accumulator and the indicating register are carried out, and the result thereof enters the accumulator and thereafter, as mentioned above, it is transferred from the accumulator to the indicating register, and is indicated.

Figure 3:
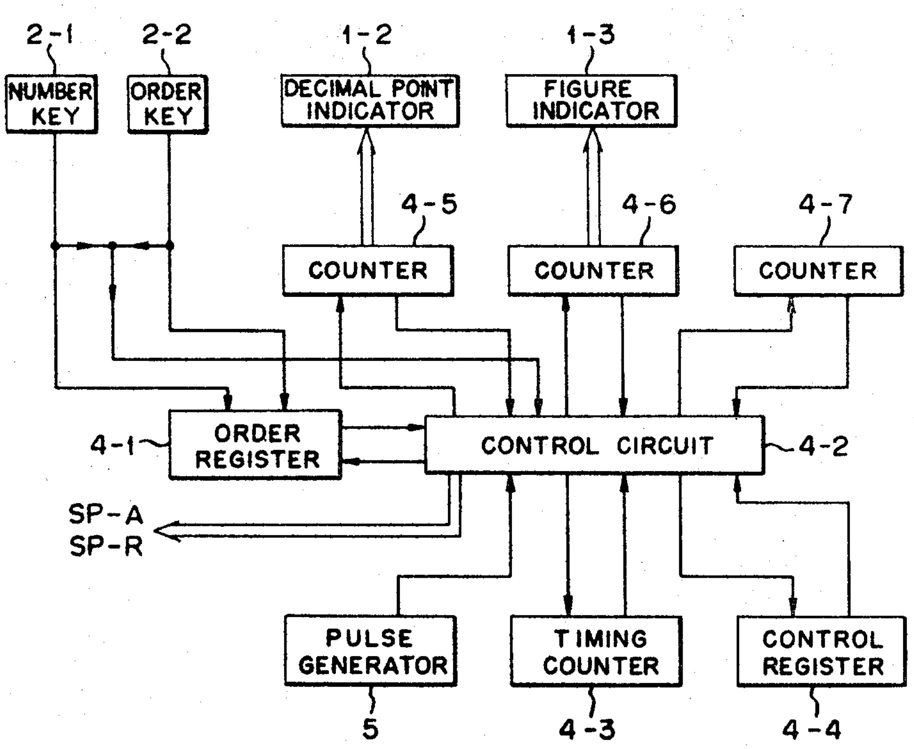
FIG. 3 is a block diagram of the controlling system.

The indicating register only works as a shift register in general cases, and therefore in the normal case, the gate G–1 is opened at (S–1)=0, and the gate G–2 is closed at (S–2)=0, and at the same time the 1 subtracter 3–4 does not work. FIG. 3 shows the controlling portion of the system.

Figure 8:
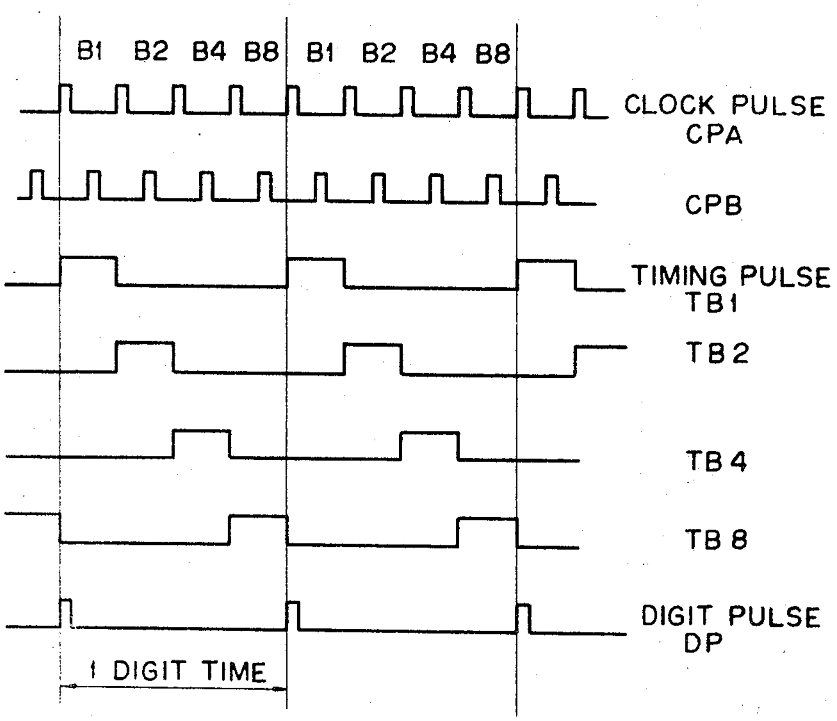
FIG. 8 shows a synchronous pulse train.

The pulse generator 5 generates the synchronous pulses such as clock pulses or the like which synchronize the whole system, and it can be composed of conventional means. The periodical relation of the pulses sent to the controlling means 4 (FIG. 1) from the pulse generator 5 is shown in FIG. 8.

In regard to said synchronous pulses, as the clock pulse there are two pulses, i.e., CPA and CPB, and CPA and SPB have ½ bit time difference. In the diagram, the four pulses shown by TB1, and TB2, TB4, and TB8, are the timing pulses, and during 1 bit time of the four bit times, for each figure only one such timing pulse is generated. These pulses have 1 bit time difference, and the rise and fall are synchronized with the use of CPA. Therefore the timing pulses correspond to the weight of the bits within one figure of the numbers coming out of the accumulator and the indicating register.

In the diagram, the digit pulse DP is the one which is produced by synchronizing one of the four of CPA for one digit time with TB1, and there is a relation that DP is equal to CPA·TB1.

The order key 2—2 is the calculation order key, and it is composed of the four calculation keys, i.e. the addition key (+, =), the subtraction key (—, =), multiplication key (×), the division key (÷), and the clear key (CL), and the transfer key (T) and such like keys.

The signals of the number key or order key when touched become 1, and when they are released, become 0.

Figure 9:
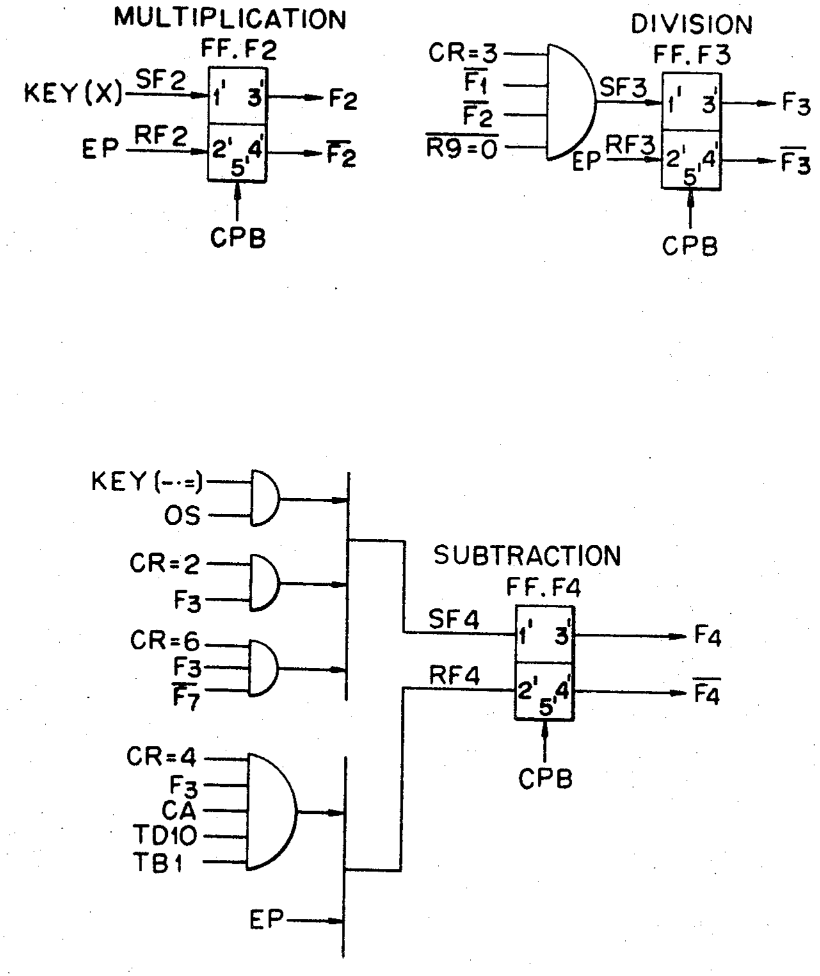
FIG. 9 shows the arrangement of the order-register.

The order register 4–1 memorizes the contents of the order key, and as is shown in FIG. 9, it is composed of the multiplication flipflop F2, the division flipflop F3, the subtraction flipflop F4, i.e., three flipflops, and the flipflops are synchronized by clock pulse CPB.

Figure 10:
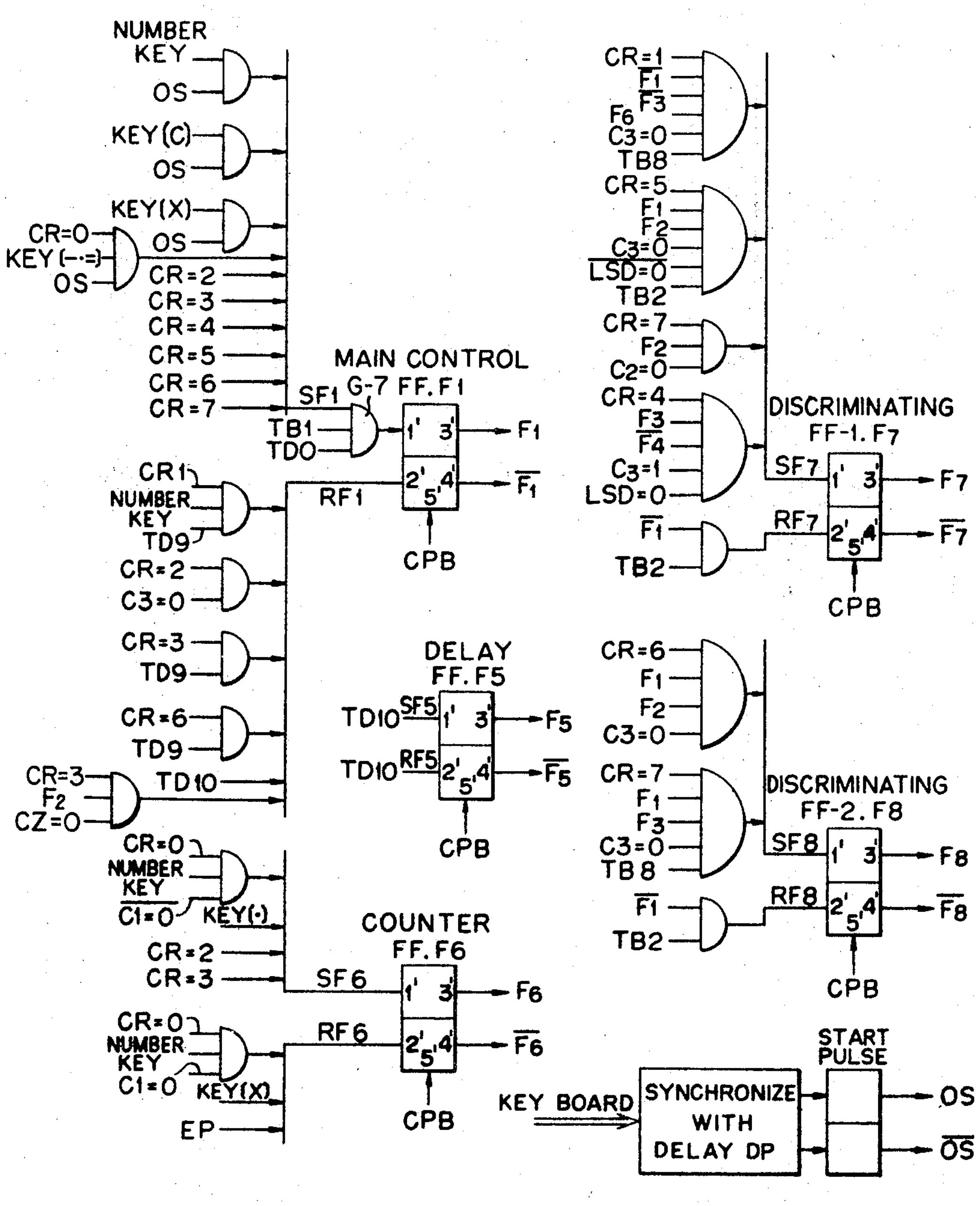
FIG. 10 is a flipflop diagram composing a part of the controlling circuit.

The control circuit 4–2 makes the control signal for controlling the whole computer, the shift pulse to the shift register, and the counting pulse to the respective counters, and comprises logical AND circuits shown in FIGS. 9, 10, and 12–15, and the flip-flop of the synchronizing system shown in FIG. 10.

The respective flipflops, which provide a part of said controlling circuit, are shown in FIG. 10. In the diagram F1 is the main control flipflop, and carries out various kinds of controls such as the control of the counting pulses to the counter and the shift pulse to the shift register.

The set signal SF1 of the flipflop F1 is gated by TDO, which is described hereinafter, and TB1, at the gate G–7, and is synchronized by the clock pulse CPB, and therefore the timing wherein the flipflop F1 is set, is alaways constant. The delay flipflop F5 is operated by being delayed by ½ bit behind TD10, which is described hereinafter. The counter FFF6 controls the pulse gates of the counter (3) 4–7 and the counter (1) 4–3, as is shown in FIG. 3.

The discriminating flipflops F7 and F8 memorize the judged states temporarily.

Figure 11:
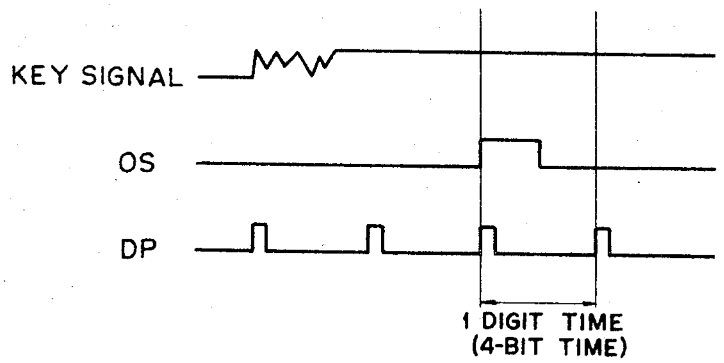
FIG. 11 shows the start pulse generated when the key is touched.

A one shot multivibrator generates the start pulse at the time when the number key and the order key are touched, and as is shown in FIG. 11, where the time relation is shown, after the key is touched, the start pulse OS is delayed by the time required for stabilizing the signal of the key, and thereafter it is produced in synchronous operation with the rise of DP, and the pulse width thereof is appropriately selected to have longer than ½ digit time, and shorter than 7/2 bit time.

Figures 12, 13:
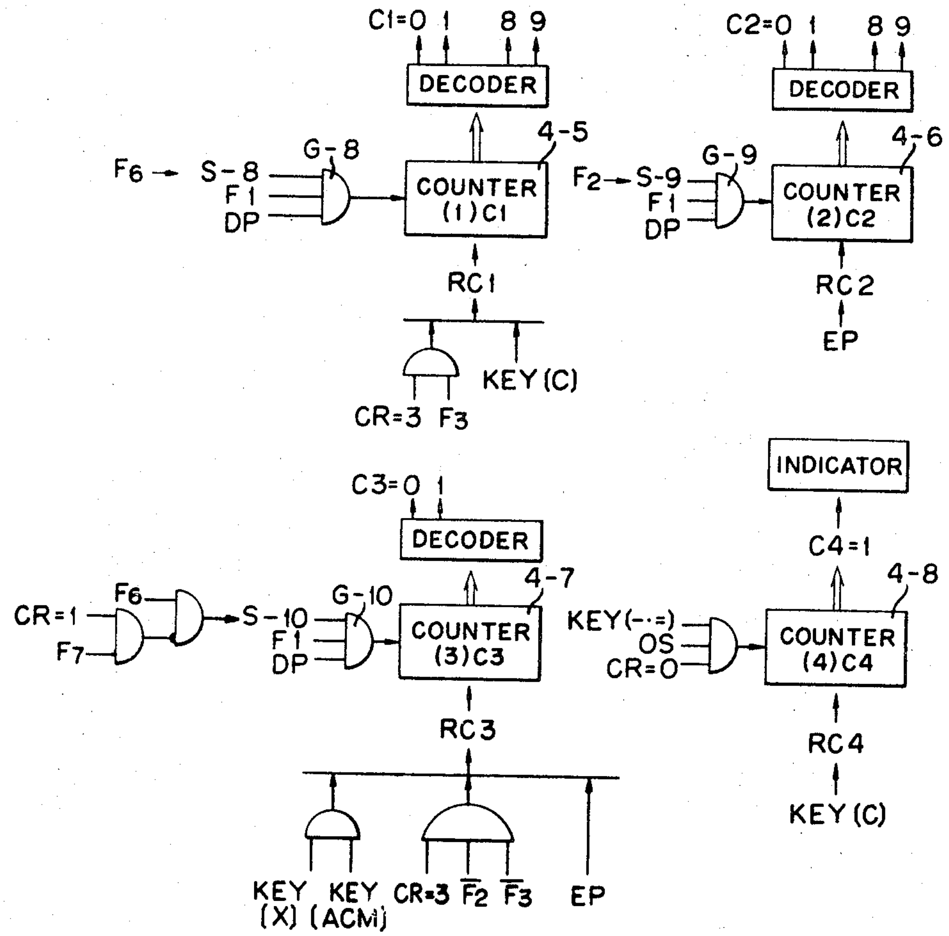
FIG. 12 shows the operation of the three counters.
FIG. 13 is a diagram showing the corresponding relation between the indicating register and the counter.

The three counters, i.e., the counter (1) 4–5, the counter (2) 4–6, and the counter (3) 4–7, are the decimal system counters having the same number of figures as the indicating register 3–1, and count out the digit pulse DP, and as is shown in FIG. 12, at the pulse gates G–8, G–9, and G–10 of the respective counters, the digit pulse DP is gated by the signals S–8, S–9, S–10, and flipflop F1, and in regard to the operation of these three counters, the counter (1) 4–5 shows the position of the decimal point of the number set in the number indicator, and is connected to the decimal point indicator through the decoder, and indication is made in correspondence with the number; the counter (2) 4–6 counts out the number of the figures of the number to multiply at the time of multiplication, and can be used for counting out the number of figures and indicates the position corresponding to the number in the same manner as in the counter (1) 4–5; and the counter (3) 4–7 is used to control the calculation as well as for helping the counter (1) and the counter (2).

These three counters are the decimal system counters having number of figures equal to that of the indicating register 3–1, and have ten varied states, and these ten varied states are numbered, i.e., 0.1.2.3.4.5.6.7.8.9 and the state wherein the counter is reset, is made to be 0, and every time one pulse is counted out, the number is successively increased as 1, 2, . . ., and the signal numbers which are sent from the decoder belonging to the respective counters are made to agree with said numbers of states. Also, the counter (1) can be represented by $C_1$, and the counter (2) can be represented by $C_2$, and the counter (3) can be represented by $C_3$, and in case the state of the counter (1) is in the state of 5 it can be represented as $C_1=5$, and 1 is generated for the signal $C_1=5$.

The counter (1) and the counter (2) always correspond to the number, and the corresponding relation with the position of the figures of the indicating register is shown in FIG. 13. In the counter (3), in most cases, the output signal from the decoder requires $C_3=0$, $C_3=1$ only, and $C_3=2, \ldots 9$ are not required in view of the functions of the counter (3), and therefore they are not connected.

The counter $C_4$ is a binary counter, and as described hereinafter, is used for controlling an associated indicator to show whether the indication of indicator 1—1 is a true number or its complement.

Figure 14:
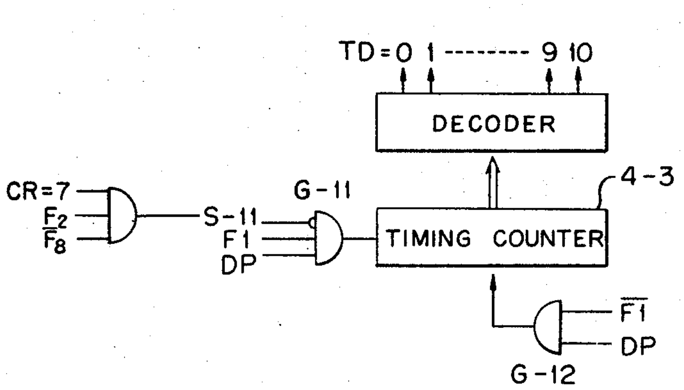
FIG. 14 shows the timing counter.

The timing counter 4–3 (FIG. 14) is the counter observing the number of figures of the shifted numbers within the shift register, and can count a number which is larger at least by 1 than the number of figures of the indicating register, and in the case of the present computer, it is a decahexagonal system counter and counts out digit pulse DP, and as is shown in FIG. 14, digit pulse DP is inhibited by the signal S–11 and gated by $F_1$ at the gate G–11, but in most cases, the signal S–11 is not generated, and therefore it is gated by $F_1$ and it can be considered that it counts out digit pulse DP during the time at which $F_1=1$.

In case F $F_1$ is equal to 0 at the gate G–12, the timing counter can be reset by the digit pulse. This counter is provided with a decoder, as is shown in FIG. 14, and the signal representing the state of the counter, i.e., $TD=0$, 1, 9, 10, . . . can be obtained, but in most cases, four kinds of signals, i.e., $TD=0$, $TD=1$, $TD=9$ and $TD=10$, are required and the rest are not required, and therefore the rest are not connected. The significance possessed by said four kinds of signals shows the original state when $TD=0$ is generated, and 1 figure right shift when $TD=1$ is generated, and 1 figure left shift in the case of $TD=9$ and the whole figure shift in the case of $TD=10$.

Timing counter 4–3 is concerned with only the frequency of the shifts of the numbers and therefore, it cannot be included in the expression of "2 to 3 counters" as is given in the present specification.

Figure 15:
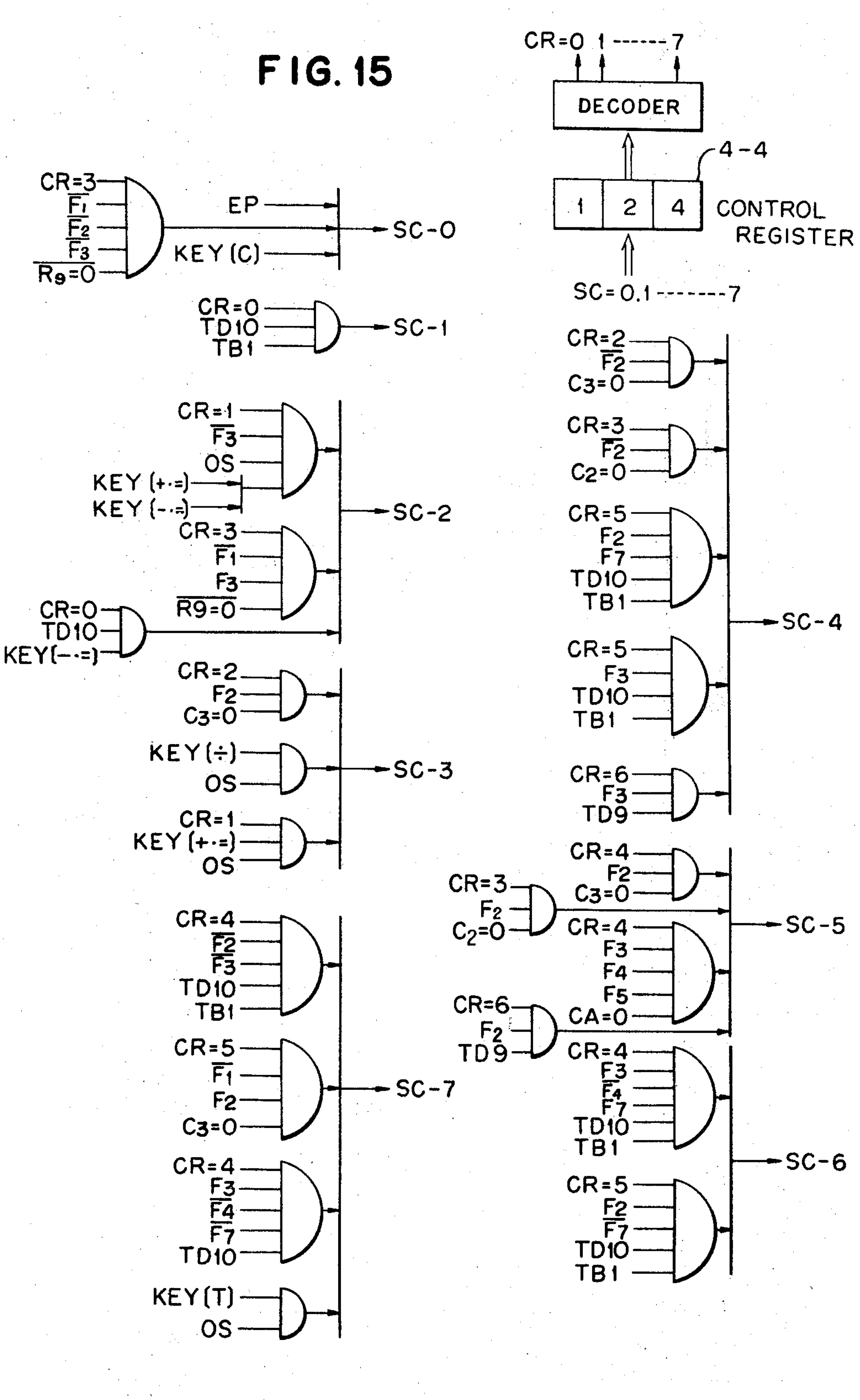
FIG. 15 is a block diagram of a part of the controlling register.

The control register 4—4 is the register for determining various kinds of processes, and as shown in FIG. 15, it is composed of three flipflops, and memorizes 3 bits, and gives each bit the weight of 1.2.4, and has 8 states from 0 to 7, and sends the signals $CR=0, 1, \ldots 7$, which show either of said eight states, to the control circuit 4–2 through the decoder. It is possible to set in any optional state by the set signals $SC=0, 1, \ldots 7$ from the control circuit.

Figure 16:
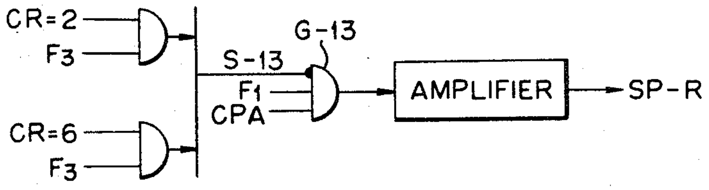
FIG. 16 and FIG. 17 show shift pulse distributor.
Figure 17:
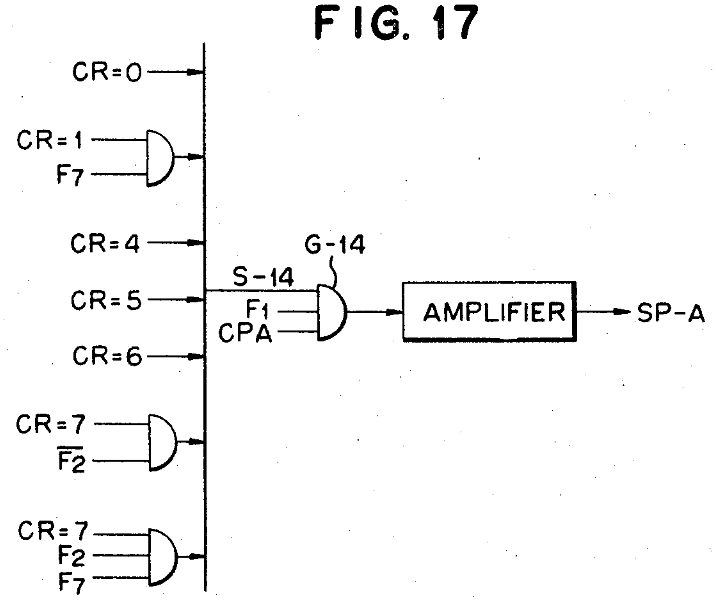

FIG. 16 and FIG. 17 show the distributor of shift pulses to the indicating register and accumulator, which are generated in the control circuit. As can be judged from the drawing, the shift-pulse SP–R of the indicating register is $$SP\text{-}R=CPA\cdot F_1\cdot \overline{S\text{-}13}$$

and therefore when the signal S–13 is 0, the gate G–13 is opened within the time while 1 is generated in the flipflop $F_1$ to pass CPA, and this signal is amplified and wave-rectified to generate the shift pulse SP–R.

In the same manner, the condition under which the shift pulse SP–A of the accumulator is generated, is $SP\text{–}A = CPA \cdot F_1 \cdot S\text{–}14$.

Figure 18:
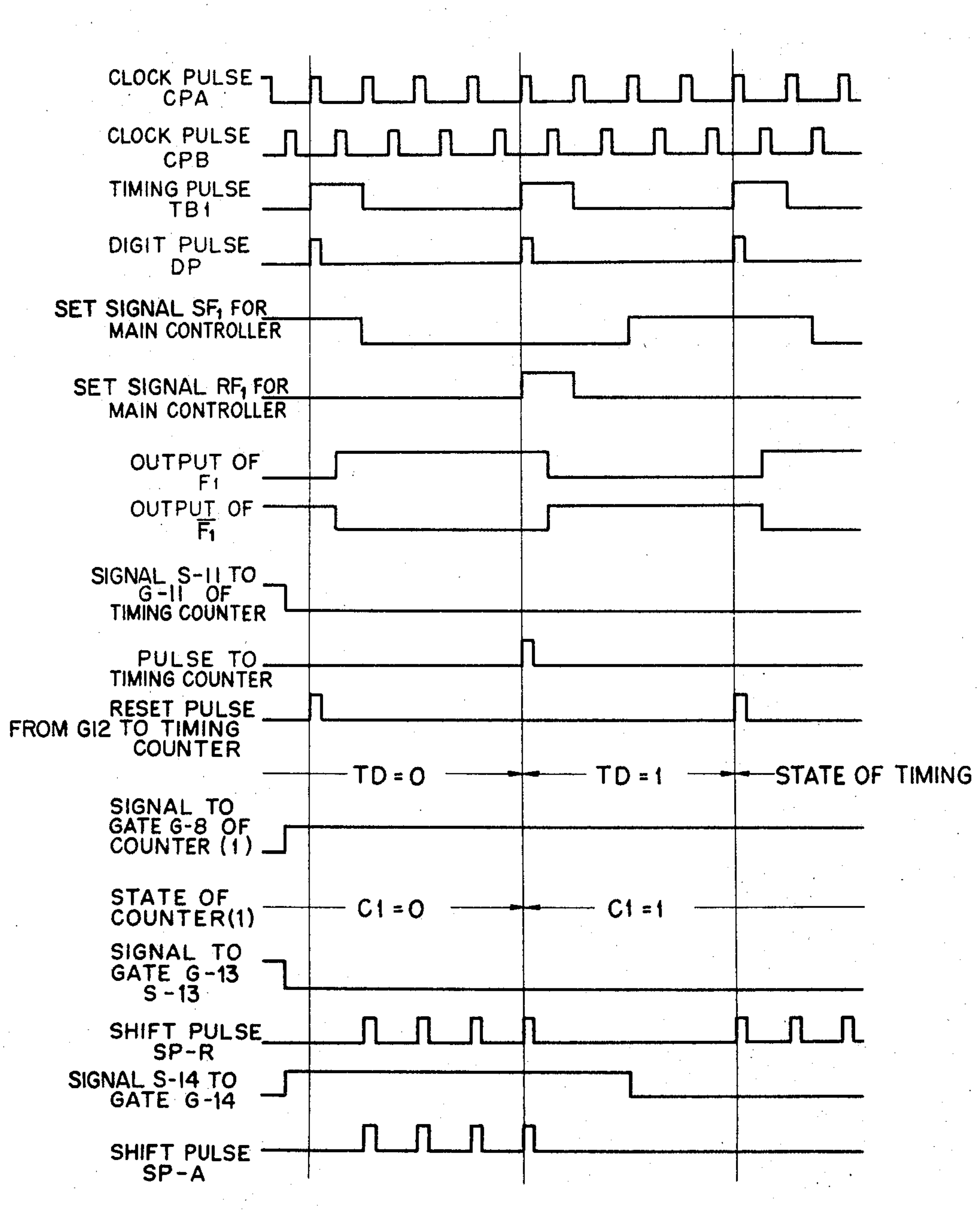
FIG. 18 shows the relation between the synchronous pulses and other pulses.

FIG. 18 shows an example of the relation of the synchronizing pulses, the main controlling means $F_1$, the counter (1), the timing counter, the shift pulse SP–R and SP–A and so on.

Figure 19:
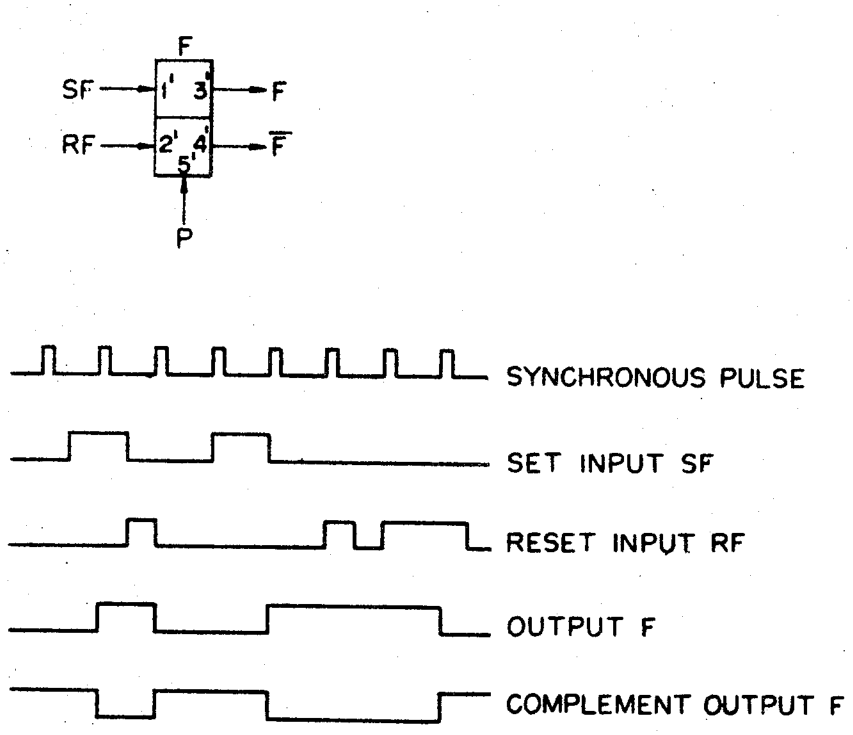
FIG. 19 shows the flipflop of the synchronous system.

FIG. 19 shows the operations of a flipflop F of a synchronous type which is employed in the present computer, wherein the set signal SF is applied to the terminal 1 and the reset signal RF is applied to the terminal 2 in synchronous operation with the synchronous pulse P applied to the terminal 5, whereby the flipflop is set or reset. The output signal F of the terminal 3 is 1 when the flipflop is set and is 0 when it is reset, and the output signal $\overline{F}$ of the terminal 4 is the complement of F.

There are various kinds of methods to trigger flipflops, but in the present computer, the input signal is delayed in the trigger circuit of the flipflop, and triggering by means of a synchronizing pulse is employed. Therefore if the input signal has arrived before the synchronizing pulse is applied, the flip-flop can be set or reset, but when the input signal arrives within the time while the synchronizing pulse is applied, there is no possibility that the flipflop will be operated at said time, as shown by the wave-forms.

The number indicator 1—1 (FIG. 2A) which represents the converted decimal system numbers is the means for converting the contents of the indicating register R (3–1) into a visible display, i.e., light, and the contents of the indicating register, 4 bits per one figure, can be decoded to illuminate the numbers from 0 to 9, and the respective figures of the indicating register R, and the respective figures of the number indicator 1—1 correspond in the relation of one to one.

The number indicator can also indicate the position of the decimal point, and when the decimal point key is pushed, the counter FF, $F_6$ (FIG. 10) is set, and the output signal thereof transmits the signal S–8 to the pulse gate G–8 of the counter $C_1$, and thereby the figure of the decimal point is counted out by the counter $C_1$, and the signal corresponding to the number of figures is transmitted to the decoder.

The decoder has the same number of figures as the number indicator 1—1, and by means of the output signal thereof the indicating lamp within the number indicator 1—1 is put on to indicate the position of the decimal point. Thus, it is possible to indicate the position of the decimal point within the indicator register.

Next, at the time when the multiplication is carried out, it is possible to carry out the indication of the notation of multiplication, such as the symbol × between the multiplier and the multiplicand which are memorized in the indicating register R, by the effect of the counter $C_2$ and the figure indicator 1–3 (refer to Order No. 8–12 of FIG. 24). In other words, when the multiplication key × is pushed, the multiplication flipflop, $F_2$ (FIG. 9) is set, and the output signal S–9 is transmitted to the pulse gate G—9 (FIG. 12) of the counter $C_2$, and thereby the gate G–9 is opened, and the figures of the multiplier are counted, and the signal corresponding to the number of figures is transmitted to the decoder.

The decoder has the same number of figures as the indicating register 3–1, and therefore by means of the output signal thereof, the indicator lamps within the indicator, are put on, and between the multiplier and the multiplicand, the above mentioned notation of multiplication × is indicated.

Next, the calculation operation of the present computer is explained. FIG. 22 shows the outline of the control order $CR=0$ to $CR=7$ during various kinds of process, and the corresponding calculating operation.

I. Addition

Example 1

$$123.4+9.567=132.967$$

(1) As is shown in the order of operations No. 1 of Embodiment 1 of FIG. 23, first of all, the number keys 2–1 are pushed in turn from the higher order numbers and after "123.4" is set, the notations "+.=" are pushed by the addition key 2—2 and the addition of the number 0 is carried out, and the result of calculation "123.4" is obtained. In this case, all the memories of the computer have initially been cleared by pushing the clear key (CL), and as a result the number 0 was memorized.

The above mentioned process and the calculating operations are the same in each of the embodiments, and therefore they are omitted in the following explanations.

In this case, the number 1234 is set in the indicating register R(3–1), and the counter (1) 4–5 is in the state of $C_1=9$ (the position of the decimal point is at the position of 1, see FIG. 13), 123.4 is indicated by the indicating means 1—1 and other registers and the counters are all in the state of 0.

Figure 2B:
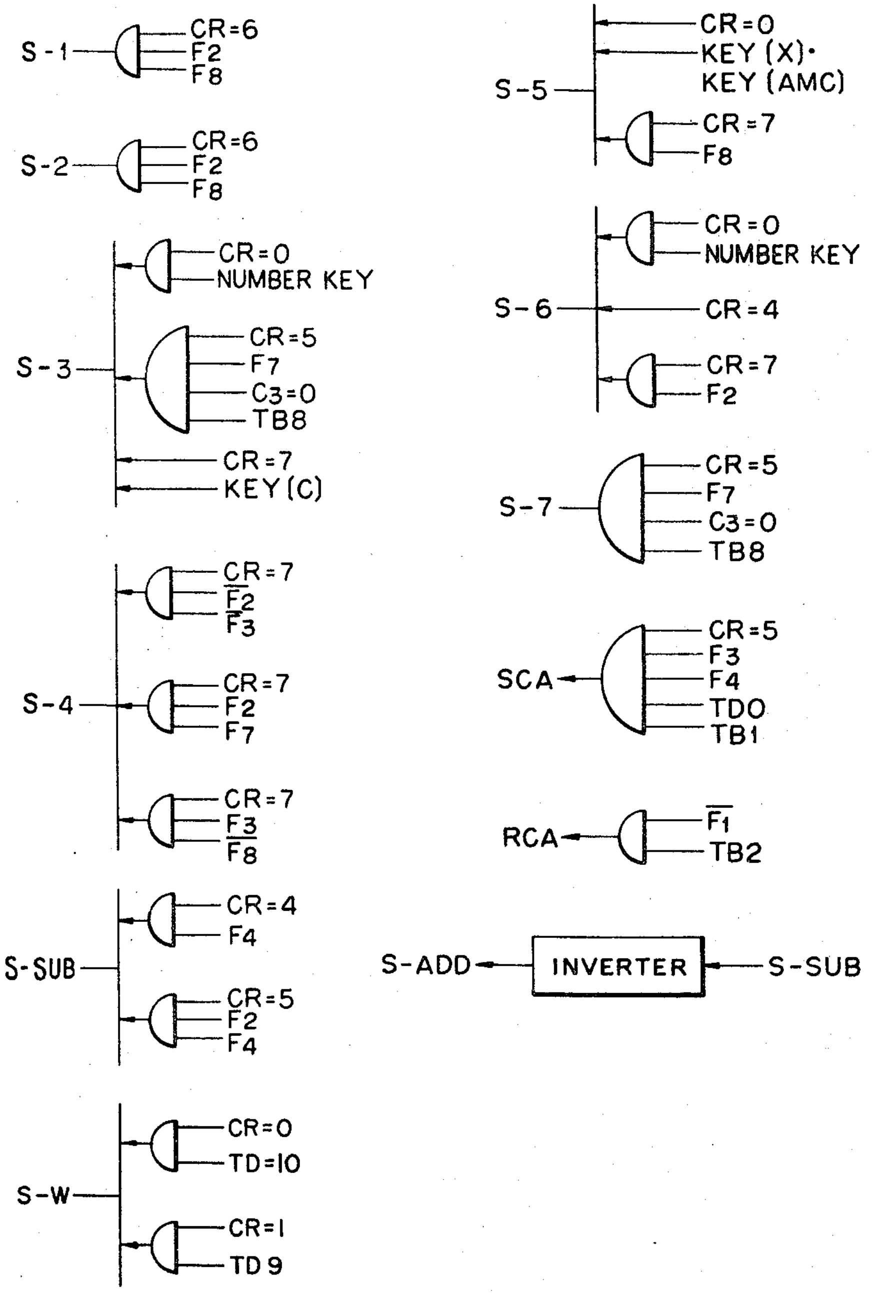
FIG. 2B is a diagram illustrating the constitution of certain signals.

(2), (3) Next, the number key "9" is pushed and as shown in the order of operations No. 2 and No. 3, the gate signal S–6 in FIG. 2B becomes equal to 1, and the gate G–6 (FIG. 2A) is opened, and the gate signal S–3 becomes 1 and the gate signal S–5 becomes 1, and the gate G–3 and the gate G–5 are closed. The main control means flipflop $F_1$ is set, and the counter flipflop $F_6$ is set.

$S\text{–}3 = (\text{number key}) \cdot (CR=0) + \ldots\ldots\ldots$
$(S\text{–}5) = (CR=0) + \ldots\ldots\ldots\ldots\ldots\ldots\ldots\ldots$
$(S\text{–}6) = (\text{number key}) \cdot (CR=0) + \ldots\ldots$
$(SF_1) = (\text{number key}) \cdot (OS) + \ldots\ldots\ldots$
$(SF_6) = (\text{number key}) \cdot (CR=0)(\overline{C_1=0}) + \ldots\ldots$ (Hereinafter the conditions for the occurrence of the respective signals are specified only in special cases.)

Therefore $FF \cdot F_1$ is 1 and the shift pulses SP–R and SP–A are sent to the indicating register R (3–1) and the accumulator (3–1), respectively, and the number is transmitted to the accumulator ACC from the indicating register R, and the indicating register is cleared.

$$(S\text{–}14) = (CR=0) + \ldots\ldots$$

The counters $C_1$ and $C_3$ receive the signals S–8 and S–10 by the set of the $FF \cdot F_6$, and the digit pulse DP is counted, and also digit pulse DP is counted by the timing counter (4–3) as $F_1$ is set.

During this process when the counter $C_1$ is equal to 0, the counter $FF \cdot F_6$ is reset, i.e.

$$(RF_6) = (CR=0) \cdot (C_1=0) \cdot (\text{number key}) + \ldots$$

and the pulse gates of the counters $C_1$ and $C_3$ are closed, and thereafter counting is not carried out, and therefore the contents of counter $C_1$ are transferred to the counter $C_3$ in the relation of the complement number (No. 2).

When the whole figure shift of the numbers is carried out, the timing counter 4–3 produces the signal $TD=10$, and the main control $FF \cdot F_1$ is reset, and the number 9 from the key is set at the least significant position of the indicating register R, and the control register 4—4 is set from $CR=0$ to $CR=1$ (No. 3), namely, $(RF_1) = (TD\ 10) + \ldots\ldots\ldots$
$(SC=1) = CR=0)(TD\ 10)(TB\ 1)$
$(S\text{–}W) = (CR=0)(TD\ 10) + \ldots\ldots\ldots$ (4) Next, when the decimal point "." of the key is pushed, the counter $FF \cdot F_6$ is set.

$$(SF_6) = (\text{Key "."})$$

(5) Next, when the key "5" is pushed, the main control $FF \cdot F_1$ is set under the same conditions, and in this case, the signal is not generated in S–3 and as the result thereof the gate G–3 is opened and as S–13 is 0, the shift pulse SP–R is given $$(S\text{–}13)=(CR=2)\cdot F_3+(CR=6)\cdot F_3$$

to the indicating register, and when the timing counter TD is equal to 9, $F_1$ is reset, and as the result thereof the number within the indicating register is up-shifted by one figure, and thereafter the number "5' is set at the least significant figure.

$$S\text{–}W=(CR=1)\cdot TD\,9+\ldots\ldots$$

$$RF_1=(CR=1)\cdot(TD\,9)\ \text{(Number key)}$$

The counters $C_1$ and $C_3$ count 9 pulses as the counter $FF\cdot F_6$ is set and therefore, as the result thereof $C_1$ becomes 9 and $C_3$ becomes 0 (No. 5). The significance of the number of the counter $C_3$ is that the value of $C_3$ which was at $C_1$ at first, is memorized by the complement number, and the figures below the decimal point of the numbers to calculate, are counted along with $C_1$, and therefore as the result, the difference between the number of the figures below the decimal point of the number to be calculated and the number of the figures below the decimal point of the operand, is indicated.

Therefore, the counter $FF\cdot F_6$ is set in the number setting process of $CR=1$, and when the number is not shifted, the counter $C_3$ is in the state of $C_3=0$ and this shows that the position of the decimal point of the number to be calculated and the position of the decimal point of the operand are the same. As a matter of fact, in the setting up of the numbers up to the present moment, the number 9.5 within the indicating register and the number 123.4 within the accumulator are equal in that they have one figure below the decimal point, and therefore when the number below the decimal point is continuously set on the indicating register, the positions of decimal points of the two numbers are not changed if the number of the accumulator and the number of the indicating register are shifted together, and therefore the discriminating $FF\cdot F_7$ is set.

$$SF_7=\overline{F}_3\cdot CR=1\cdot\overline{F}_1\cdot F_6\cdot(C_3=0)\cdot(TB\ 8)+\ldots\ldots$$

$$RF_7=\overline{F}_1\cdot(TB\ 2)$$

Thereafter, when $CR=1$, S–10 is not generated, and $C_3$ does not count, namely.

$$S\text{—}10=F_6(\overline{CR=1\cdot F_7})$$

(6), (7) The numbers 6 and 7 are set.

(8) Next, when the addition key [+·=] is pushed, by means of the logical product of the signal ($CR=1$) of the control register, the gate of the state pulse $(OS)\cdot\overline{F}_3$ and the addition key [+·=] the signal of SC–2 is generated, and the control register is set in the state of $CR=2$.

In the state of ($CR=2$) to ($CR=7$), the computer is in the process of calculation, and therefore the set signal $SF_1=1$ into the main control $FF\cdot F_1$ is produced, and unles a special signal is generated, the reset signal $RF_1$ is generated by means of the signal TD 10.

$$(SC\text{–}2)=(CR=1)\cdot OS[(+=\text{key})+(-=\text{key})]\overline{F}_3$$

$$SF_1=(CR=2)+(CR=3)+(CR=4)+(CR=5)+(CR=6)+(CR=7)+\ldots\ldots$$

$$RF_1=TD\ 10+\ldots\ldots$$

CR=2 designates the treating process of the decimal point, but in the case of the present example, the position of the decimal point of the number to be calculated and the position of the decimal point of the operand are the same, and therefore this process is not necessary, and therefore in accordance with the condition of $$(CR=2)\cdot(C_3=0)\cdot\overline{F}_2$$

the control register CR is set at 4.

$$SC\text{–}4=(CR=2)\cdot(C_3=0)\cdot\overline{F}_2$$

(9) CR=4 designates the process for addition or subtraction, and the adding and subtracting signal of the adder-subtracter is $S\text{–}ADD=\overline{S\text{–}SUB}$ and the subtracting signal S–SUB is only sent at the time when the subtraction process is carried out, and therefore except for the case of the subtraction process, the adding signal S–ADD is transmitted.

$$S\text{–}SUB=(CR=4)\cdot F_4+\ldots\ldots$$

In the process of CR=4, the required gates G–1, G–3, G–5, and G–6 are opened, and the shift pulses SP–R and SP–A are carried out till the timing counter generates TD 10.

$$S\text{–}6=(CR=4)+\ldots\ldots$$

$$S\text{–}14=(CR=4)+\ldots\ldots$$

(10) When the addition is completed, the control register is set in the state of CR=7 under the condition of $$(SC\text{–}7)=(CR=4)\cdot(TD\ 10)\cdot(\overline{F}_2)\cdot(\overline{F}_3)\cdot(TB\ 1)+\ldots\ldots$$

and SP–R, SP–A are generated to transmit the signal S–4, and the gate 4 is opened, and the gate G–3 and gate G–6 are closed.

(11) The number of the accumulator is transferred to the indicating register, and by means of calculation terminating signal EP, the control register is set in the state of CR=0, and the counter $FF\cdot F_6$ is reset and the calculation is completed, namely, $$S\text{–}3=(CR=7)+\ldots\ldots$$

$$S\text{–}4=(CR=7)\cdot\overline{F}_2\cdot\overline{F}_3+\ldots\ldots$$

$$S\text{–}5=(CR=7)\cdot F_8+\ldots\ldots$$

$$S\text{–}14=(CR=7)\cdot\overline{F}_2$$

$$(SC=0)=EP+\ldots\ldots$$

$$RF_6=EP+\ldots\ldots$$

$$EP=(CR=7)\cdot TD\ 10\cdot TB\ 1$$

Example 2

$$123.4+95=218.4$$

When the number of decimal figures of the number to be calculated [123.4] is larger than the number of decimal figures of the operand [95], above mentioned steps (5) and (6) are different from Example 1 in that when CR=2, it is not in the state of $C_3=0$, but the counter $FF\cdot F_6$ is set under the condition of $(SF_6)=(CR=2)$, and since $C_3$ shows the difference of the number of the figures below the decimal point, when the indicating register is shifted until $C_3=0$ is generated, the operand is corrected to be 95.0, namely, $$SF_6=(CR=2)+\ldots\ldots$$

$$RF_1=(CR=2)\cdot(C_3=0)+\ldots\ldots$$

With respect to operations (7) to (9) and the subsequent operations they are the same as in the case of Example 1. It is noted that in the state of CR=4 and CR=7, the counters $C_1$ and $C_3$ show the same result even if they are not operated.

II. Subtraction

In carrying out subtraction the subtraction key [—·=] is used, and when CR=2, the subtraction $FF\cdot F_4$ (FIG. 9) is set, and when CR=4 the adder subtractor 3—3 is operated as a subtractor, and the rest of the operations are the same as in the case of addition, namely, $$S\text{–}SUB=(CR=4)\cdot F_4+\ldots\ldots$$

$$SF_4=(OS)\cdot(\text{Key }[-\cdot=])+\ldots\ldots$$

$$RF_4=EP+\ldots\ldots$$

III. The conversion of complement number

A negative number is indicated as the complement number. When CR=0 and the subtraction key [—·=] is pushed, the accumulator is cleared, and thereafter the control register is set at CR=2. It is possible to obtain by CR=4 the complemented number as the result of subtracting the contents of the indicating register from 0.

Further, when the subtraction key [—·=] is pushed again, it is possible to carry out the complement number conversion by the same operation, and then it is possible to continue the calculation.

Namely, after the completion of calculation, by pushing the subtraction key [—·=], the main control FF·$F_1$ is set, $$SF_1=(CR=0)\cdot(\text{Key }[-\cdot=])\cdot OS+\ldots\ldots\ldots$$

At this time, in accordance with the operation as is shown in (1) of the addition examples, each of forty shift pulses of SP–R and SP–A are generated, and in this case, the signals S–1, S–2, S–3, S–4, and S–6 are 0 and the signal S–5 alone becomes 1, namely, $$S\text{–}5=(CR=0)+\ldots\ldots\ldots$$

As a result thereof, gates G–1 and G–3 alone are opened, and the gates G–2, G–4, G–5, and G–6 are closed, and therefore the contents of the indicating register R are not changed, but the contents of the accumulator are all cleared.

Thereafter, the signal SC–2 to the control register CR is generated, and the control register is set to in the state of CR=2, and thereafter, automatic subtraction is carried out, and as a result, the contents of the indicating register can be converted from the complement into the complemented number, $$SC\text{–}2=(CR=0)\cdot TD\ 10\cdot(\text{key }[-\cdot=])+\ldots\ldots\ldots$$

and thereafter, the calculation is continued.

IV. Multiplication and multiplication addition

[Multiplication addition]

Example $$K+A\times B=3.45+2.35\times 12.4=32.590$$

Automatic clear multiplication is the same as the case wherein K is 0, and therefore an example of multiplication addition will be explained (refer to FIG. 24).

(1) In accordance with the operations described in the example of addition, the number 3.45 is obtained as the result of the calculation, and the number 3.45 is in the indicating register, and the counter $C_1=0$, and the control register $CR=0$.

(2), (3) When the key [2] is pushed, the number of the indicating register is transferred to the accumulator by the same process as in the case of addition, and the contents of the counter $C_1$ are transferred with the complement number relation to the counter $C_3$, and the control register is moved from the state of $CR=0$ to $CR=1$, and thereafter the number 2 is set at the least significant figure of the indicating register.

(4) Key [·] (decimal point) is pushed, and the counter FF·$F_6$ is set.

(5) The key [3] is pushed, and [3] is set, and $C_1=9$, and $C_3=1$.

(6) The key [5] is pushed, and [5] is set, and $C_1$ becomes 8 and $C_3$ becomes 0.

Operations from (1) to (6) do not involve multiplication operations and therefore the operations can be carried out in the same manner as in the case of addition. Therefore, the operations of the indicating register, accumulator, and the counters $C_1$ and $C_3$ can be carried out in the same manner.

(7) When the automatic clear [ACM] is set, and if the multiplication key is pushed, the gates G–5 and G–6 are closed by means of the gate signal S–5=(key[×]) and by means of $$SF_1=\text{key }[\times]\cdot OS+\ldots\ldots$$

and $$S\text{–}14=(\text{key }[\times])\cdot(\text{key }[ACM])$$

forty shift pulses SP–A are generated, and the contents of ACC are cleared and the counter $C_3$ is reset to $C_3=0$ by means of the signal $$RC\text{–}3=(\text{key}-[\times])\cdot(\text{key }[ACM])+\ldots\ldots$$

When the multiplication (key [×]) is pushed, and by $SF_2=(\text{key }[\times])$, the multiplication $FF\cdot F_2$ is set, and at the same time, the counter $FF\cdot F_6$ is reset. The condition for the reset in this case is $$(RF_6)=(\text{key }[\times])+\ldots\ldots$$

and $F_2$ is set and thereby the signal S–9 is sent to the gate G–9 of the counter $C_2$, i.e. ($S\text{–}9=F_2$).

The counter $C_2$ counts the number of figures of the multiplier and therefore after the key [×] is pushed, by counting the number of figures of the indicating register to be shifted, the position of the figure of the least significant figure of the multiplicand is indicated as a result thereof.

The counter $FF\cdot F_6$ is reset by means of the key [×], and this is for operating the counters $C_1$ and $C_3$ against the number of figures below the decimal point.

In the multiplier setting operation, the same operation as before mentioned can be made, and the multiplier is set successive to the set of the multiplicand in the indicating register, and the indication corresponding to the notation × is indicated between the multiplier and the multiplicand by the effect of the figure indicator 1–3 and the counter $C_2$ for counting the number of figures of the multiplier.

(8) The key [1] is pushed, and the number 1 is set.

(9) The key [2] is pushed, and the number 2 is set.

(10) The key [·] is pushed, and the counter FF·$F_6$ is set, and the conditon of setting of $F_6$ is $$(SF_6)=(\text{the key }[\cdot])+\ldots\ldots\ldots$$

In this case, in the same manner as in addition, the counter $C_3$ is in the state of $C_3=0$, and therefore there is brought about the condition that the discriminating FF·$F_7$ is set.

The conditions of the set of $F_7$ is, $$(SF_7)=(CR=1)\cdot\overline{F}_1\cdot\overline{F}_3\cdot F_6\cdot(C_3=0)\cdot(TB8)+\ldots\ldots$$

(11) The key [4] is pushed and the number 4 is set.

In regard to the association of the figures of the numbers including decimal points, the total of the number of figures below the decimal points of the multiplier and the multiplicand is equal to the number of figures below the decimal point of the product, and in the same operation as in the operation of addition, the figure association can be carried out at the time when multiplication-addition is carried out.

(12) When the key for start (addition key), i.e., the key [+ · =] is pushed, the control register sets $CR=2$ under the condition of $$(CR=1)\cdot OS\cdot\{\text{key }[+=]\text{ or key }[-=]\}\cdot\overline{F}_3$$

and thus counter FF·$F_6$ is set at $CR=2$ to associate the figures of decimal points. In the present example, the counter $C_3$ is in the state of $C_3=0$, and it is not necessary to carry out the figure associating operation, but if the counter $C_3$ is not in the state of $C_3=0$, the indicating register is shifted till the signal of $C_3=0$ is generated as in the same process as in Example 2 of addition. In other words, in a case such as 3.45+23.5×124, it is corrected to be 3.45+23.5×124.0.

(13) In the case of $CR=2$, when $C_3=0$ is generated, the control register is set at the state of $CR=3$ under the condition of $SC\text{–}3=(CR=2)\cdot(C_3=0)\cdot F_2+\ldots\ldots$, and the indicating register is shifted till the counter $C_2$ becomes 0, under the condition of $$RF_1=(CR=3)\cdot F_2\cdot(C_2=0)+\ldots\ldots$$

and the multiplier and the multiplicand are separated.

The counter $C_1$ shows the position of the decimal point against the calculating result, and therefore it is not necessary to operate the same.

However, since $F_6$ is not reset, the counter $C_3$ is successively operated. The counter $C_3$, when it is operated, indicates the position of the least significant figure of 124, i.e., the multiplier, and the counter $C_2$ indicates the least significant figure of the multiplicand 2.35, and by means of the counters $C_2$ and $C_3$ it is operated where the relation is maintained constant.

Figure 20:
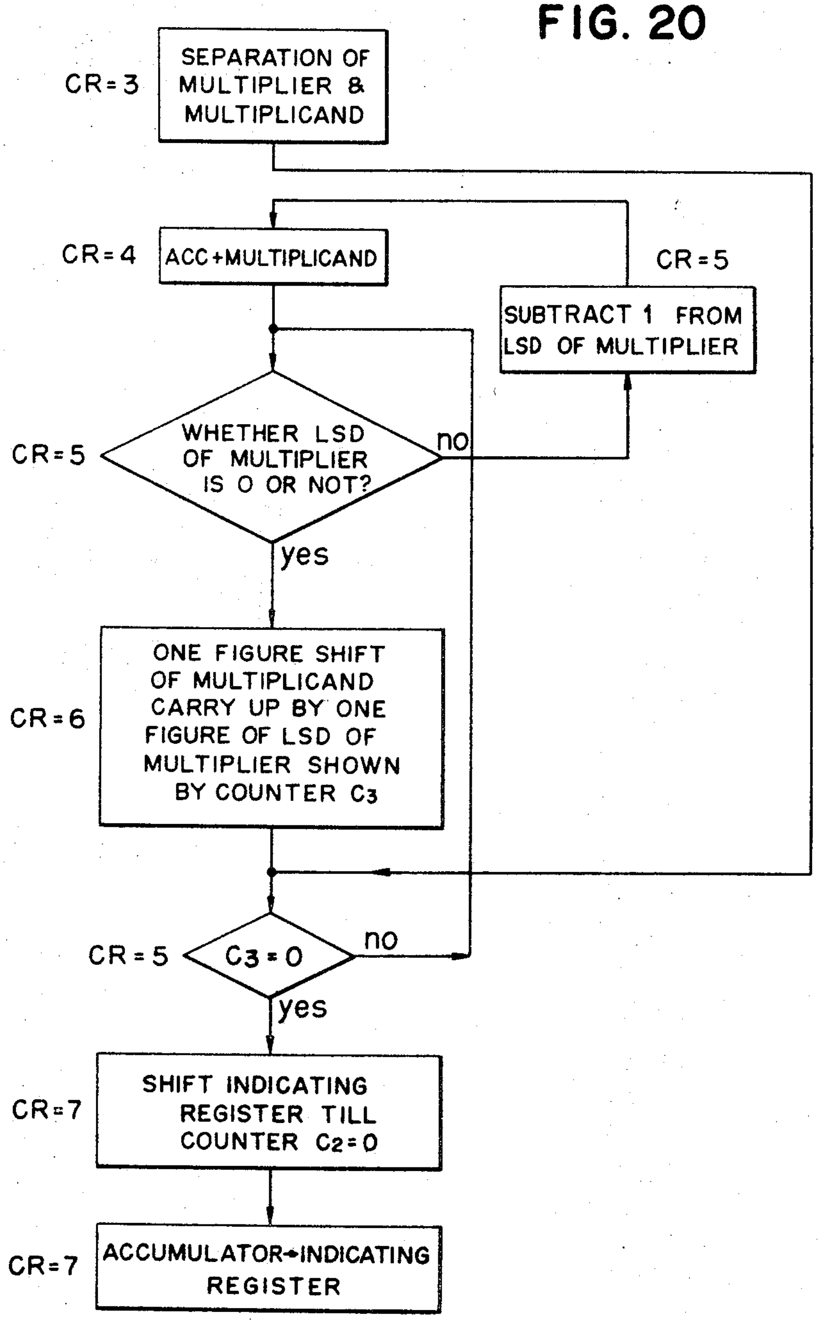
FIG. 20 and FIG. 21 are the flow charts in the respective multiplications and divisions.

When it has been operated, the control register is set on $CR=5$ by $SC\text{-}5=(CR=3)\cdot F_2\cdot(C_2=0)$, and the actual calculation is started, and the flow chart thereof is shown in FIG. 20. The calculation is carried out by means of repeating addition, which is a conventional method, but in the computer of the present invention, the multiplier and the multiplicand are within the same register, and therefore various kinds of considerations are made, namely, (a) When the contents of the indicating register are added, only the multiplicand is added.

(b) The least significant figure of the multipler is always observed, and it is determined whether the number of said figure is 0 or not, and in case when it is not 0, 1 is subtracted from the least significant figure.

(14) First of all, $$CR=5 \text{ is set by } F_2\cdot CR=3\cdot(C_2=0)+\ .\ .\ .$$

and the discrimination of the counter $C_3=0$ is carried out, and in case the answer is [no], the figure to multiply is present, and therefore the whole figure shift of the indicating register is carried out by means of forty shift pulses SP–R, and during this process, the counter $C_3$ showing the least significant position of the multiplier becomes 0, and from the moment when $C_3$ becomes 0 the contents of the next operation (15) is checked during one bit time.

(15) The least significant figure of the multiplier is present at the position of the LSD, and therefore at this time, it is determined whether or not the contents are 0 and when not 0, the discriminating $FF\cdot F_7$ is set by $SF_7=F_2\cdot(CR=5)\cdot(C_3=0)\cdot\overline{LSD=0}\cdot F_1\cdot TB2+\ .\ .\ .\ .\ .$, and thereby the gate signal S–3 and the subtraction signal S–7 are generated to control the gate G–3 and the subtractor 3–1, to subtract 1 from the least significant figure of the multiplier, namely, $$S\text{-}3=(CR=5)\cdot F_7\cdot(C_3=0)\cdot TB8+\ .\ .\ .\ .\ .\ .$$
$$S\text{-}7=(CR=5)\cdot F_7\cdot(C_3=0)\cdot TB8\ .\ .\ .\ .\ .\ .$$

(16) to (19) When the least significant figure of the multiplier is shifted to the most significant figure, 1 is subtracted. After whole figure shift is carried out, i.e., after the completion of $CR_5$, the discriminating $FF\cdot F_7$ is reset, and by $SC\text{-}4=(CR=5)\cdot F_2\cdot F_7\cdot TD10\cdot TB1+\ .\ .\ .\ .\ .\ .$, the addition step is carried out, and during the operation, when addition is carried out the multiplier is also added, and therefore when $C_3$ becomes 0, by means of $$SC\text{-}5=F_2\cdot(C_3=0)\cdot(CR=4)+\ .\ .\ .\ .\ .\ .\ .\ .\ ,$$

$CR=5$ is set, and when the gate G–6 is closed the discriminating operation is simultaneously carried out, namely, $$S\text{-}14=(CR=4)+(CR=5)+\ .\ .\ .\ .\ .\ .\ .$$
$$S\text{-}6=(CR=4)+\ .\ .\ .\ .\ .\ .\ .\ .\ .\ .\ .$$
$$RF_7=\overline{F}_1\cdot TB2$$

(20) The above mentioned operation is repeated 4 times, but in the 4th discrimination, the least significant position of the figure to multiply becomes 0, and the discriminating $FF\cdot F_7$ is not set, and along with the completion of $CR=5$, $CR=6$ is set by $$SC\text{-}6=F_2\cdot(CR=5)\cdot\overline{F}_7\cdot TD10\cdot TB1+\ .\ .\ .\ .\ .$$

(22) to (25) In these operations, the multiplicand within the indicating register alone is shifted to the left by one figure, and the indicating register is shifted by 9 figures, namely, $RF_1=(CR=6)\cdot TD9$, however, in order not to shift the multiplier in the shift process, when $C_3=0$, by means of $$SF_8=F_2\cdot(CR=6)\cdot(C_3=0)\cdot F_1+\ .\ .\ .\ .\ .\ .\ ,$$

the discriminating flipflop $F_8$ is set, and by opening the gate G–2 and closing the gate G–1 by means of the gate signal $S\text{-}1=S\text{-}2=(CR=6)\cdot F_2\cdot F_8$, the multiplier is not shifted.

The counters $C_2$ and $C_3$ count nine pulses, and as a result thereof, the positions shown by $C_2$ and $C_3$ are carried up by one figure. Thereafter, by $$SC\text{-}5=F_3\cdot(CR=6)\cdot(TD9)+\ .\ .\ .\ .\ .\ ,$$

$CR=5$ again set, and $F_8$ is reset by $RF_8=\overline{F}_1\cdot TB2$ and the calculation is carried out in accordance with the flow chart, and after passing the operation of $CR=6$ three times (FIG. 24) $CR=5$ is set, and at this time the counter $C_3$ becomes at the state of $C_3=0$, and this means the completion of calculation.

(26) Next, $CR=7$ is set by means of $$SC\text{-}7=F_2\cdot(CR=5)\cdot\overline{F}_1\cdot(C_3=0),$$

and the indicating register alone is shifted till $C_2$ becomes 0 while stopping the timing counter by means of the signal $S\text{-}11=(CR=7)\cdot F_2\cdot\overline{F}_8$, and after turning back the multiplicand to the original position, the discriminating $FF\cdot F_7$ is set, and the gates G–4 and G–6 are opened, and since $F_7=1$, S–11 becomes to 0 to operate the timing counter, and after the contents (result) of the accumulator is transmitted to the indicating register, and the contents of the multiplicand of the indicating register is transmitted to the accumulator, the calculation terminating signal $EP=(CR=7)\cdot TD10\cdot TB1$ is generated in the same manner as in the case of addition.

(27) The counter $C_3$, the order register, the control register, and so on are reset, and the calculation is terminated, namely, $$SF_7=(CR=7)\cdot F_2\cdot(C_2=0)+\ .\ .\ .\ .\ .\ .\ .$$
$$S\text{-}3=(CR=7)+\ .\ .\ .\ .\ .\ .\ .$$
$$S\text{-}4=(CR=7)\cdot F_2\cdot F_7+\ .\ .\ .\ .\ .\ .\ .$$
$$S\text{-}5=(CR=7)\cdot F_8+\ .\ .\ .\ .\ .\ .\ .$$
$$S\text{-}6=(CR=7)\cdot F_2+\ .\ .\ .\ .\ .\ .\ .$$
$$S\text{-}14=(CR=7)\cdot F_2\cdot F_7+\ .\ .\ .\ .\ .\ .\ .$$

The case of multiplication without a decimal point is the same as the above mentioned operations except that the decimal point counter operation is omitted.

V. Multiplication subtraction

Multiplication subtraction is carried out by the same process as multiplication addition except that subtraction is repeatedly carried out from the contents of the accumulator, and the subtraction circuit and the multiplication circuit are operated simultaneously.

VI. Division

The calculating operation in division is carried out in the same manner as in the case of general computers, but since the number of figures set in the accumulator and the number of figures set in the indicating register are the same, and there is no number register, the method of division in accordance with the present invention is different from the conventional method, in the treatment of the decimal point.

Example:

$$0.166\div3.3=0.0503030 \text{ (see FIG. 25)}$$

(1) to (7) Keys [0], [.], [1], [6], [6] are pushed and the number to be divided is set.

The key [÷] is pushed and the counter $FF\cdot F_6$ is set by $SF_6=(CR=3)$ and $CR=3$ is set by $SC\text{-}3=OS\cdot(\text{key}\ \div)+\ .\ .\ .$, and the indicating register is successively shifted to the left by one figure (by means of $RF_1=(CR=3)\cdot TD\ 9$ to shift it to the right by 9 figures) and thereby if the number of the figure which is lower than the most significant figure by one figure, i.e. 9th figure is not 0, then by means of $SF_3=\overline{F}_2\cdot(CR=3)\cdot\overline{F}_1\cdot\overline{(R_9=0)}$, FF·$F_3$ is set, and when the signal of $SC\text{-}0=(CR=3)\cdot\overline{F}_1\cdot\overline{F}_2\cdot\overline{F}_3\cdot\overline{(R_9=0)}+\ldots$, is received CR=0 is set. It is noted that $\overline{R_9=0}$ is the signal which is generated at the time when the 9th figure is not 0, and when CR becomes 0, the shift operation is stopped.

When the key [3] is pushed, the number of the indicating register is transferred to the accumulator and the contents of the counter $C_1$ are transferred to $C_3$ in a complement relation in the same manner as in the adding process. Thereafter, in the same manner as in addition, CR becomes 1 and the number 3 is set by the pushing of the key [·] and the key [3].

In the case of CR=1, the point which is different from other calculations with respect to the decimal point is that when FF·$F_3$ is set, the counter FF·$F_6$ is set, and counter $C_3$ continues its counting since FF·$F_7$ is not set due to $\overline{F}_3$, even when C counter becomes zero.

(8–9) When the division start key [+·=] (addition-key) is pushed, CR=3 is set again by $SC\text{-}3=(CR=1)\cdot OS\cdot([+\cdot=])$ key $+\ldots$, and the counter FF·$F_6$ is also set, and in the same operation as in (2) above, the indicating register is shifted to the left till the figure which is lower than the most significant figure by one figure (the 9th figure) is not 0 and the number at the most significant figure which is not 0 in the divisor and dividend are associated on the 9th figure, and by means of $SC\text{-}2=(CR=3\cdot\overline{F}_1\cdot F_3\cdot\overline{(R_9=0)}+\ldots$, $CR=2$ is set. The counter $C_1$ is reset at $RC_1=(CR=3)\cdot F_3+\ldots$, and is turned to the state of $C_1=0$, and at this time, the state number of the counter $C_3$ (in the example it is 1), indicates the difference of the number of figures above the decimal point of the divisor and the number of figures above the decimal point of the dividend.

Also, in division, conventional steps are taken by repeatedly subtracting the divisor (R) from the dividend (ACC). The result of calculation can be obtained by placing the subtracted frequency on the least significant figure of ACC, and successively obtaining the partial quotient, and consequently, the number on the most significant figure of the result of the calculation can be obtained at the least significant figure of ACC, and since the position of the decimal point against this number is given by the contents of the counter $C_3$, when the state of the counter $C_3$ is transferred in the complement number relation to the counter $C_1$ the position of the decimal point shown by the counter $C_1$ cannot be changed.

During the calculation, the counter $C_3$ is operated in a predetermined relation with the number of the most significant figure of the result of the above mentioned calculation, and therefore, if the relation is not broken till the end, the position of the decimal point against the result of calculation is shown by the counter $C_1$.

(10) to (12): By means of $S\text{-}13=(CR=2)\cdot F_3$, SP–R is stopped, and pulses are applied to the counters $C_1$ and $C_3$ simultaneously till $C_3$ becomes 0.

Figure 21:
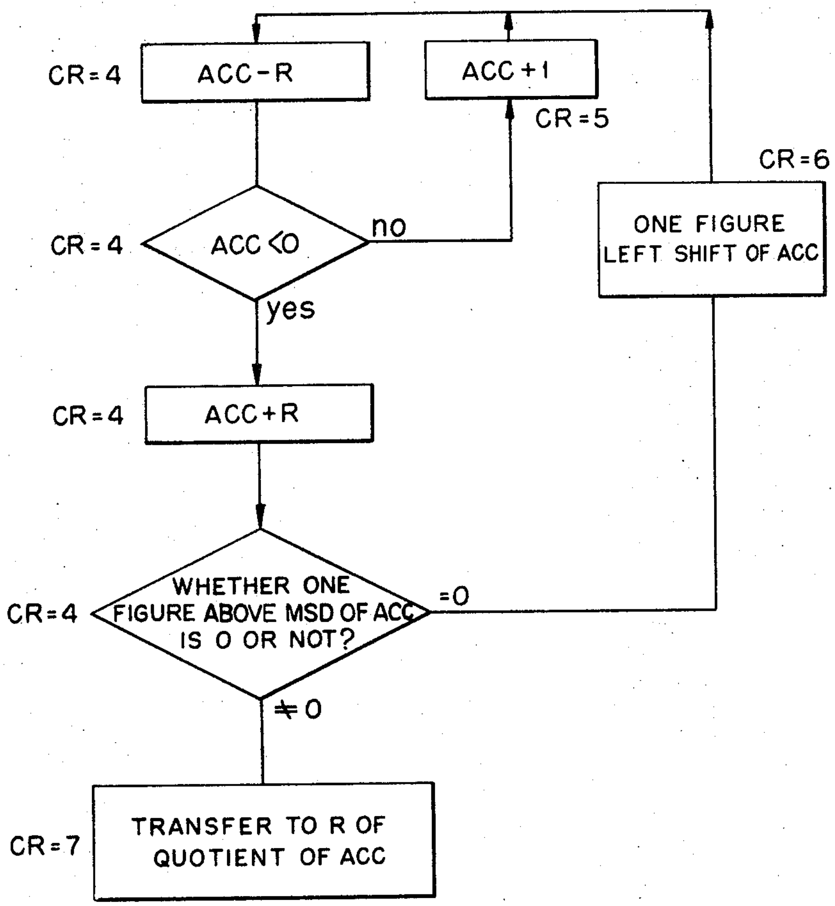

CR=4 is set from CR=2 by $SC\text{-}4=(CR=2)\cdot\overline{F}_2\cdot(C_3=0)+\ldots$, and as is shown in the flow chart of FIG. 21, R is subtracted from ACC (subtraction FF·$F_4$ is set by $SF_4=(CR=2)\cdot F_3$). After CA is reset by the signal $RCA=\overline{F}_1\cdot TB2$ by determining that ACC is smaller than 0 (borrowed CA of the adder-subtractor is equal to 1) and by $RF_4$, R is added to ACC and it is turned back to the original state by $F_4=0$, which is caused by $RF_4=(CR=4)\cdot F_3\cdot CA\cdot TD10\cdot TB1+\ldots$. The number at the least significant figure of ACC is the partial quotient obtained as the number of the most significant figure of the quotient which is the result of the calculation, and in the present example 0 was obtained.

The counter $C_3$ always shows the most significant position of the result of calculation. Therefore when $C_3$ becomes equal to 1, it is determined whether the least significant figure is 0 or not, and if it is 0 (in the present example it is 0), the discriminating FF·$F_7$ is set by $SF_7=F_3\cdot(CR=4)\cdot\overline{F}_4\cdot(C_3=1)\cdot(LSD=0)+\ldots$ and it is temporarily memorized that the calculation can be continued. After this process, $CR=6$ is set by $$SC\text{-}6=F_7\cdot F_3\cdot\overline{F}_4\cdot(CR=4)\cdot TD10\cdot TB1+\ldots$$

(14) to (18) When CR=6, SP–R is stopped by $S\text{-}13=(CR=6)\cdot F_3$ and SP–A is generated by $S\text{-}14=(CR=6)+\ldots$, and ACC alone is shifted to the left by one figure, and the state numbers of the counter $C_1$ and $C_3$ are reduced by 1 by counting 9 pulses, and along with the completion of CR=6 CR=4 is set by $SC\text{-}4=(CR=6)F_3\cdot TD9+\ldots\ldots$ ACC–R is carried out at $CR=4$ by the setting of FF·$F_y$ by $SF_4=\overline{F}_3\overline{F}_7\cdot(CR=6)+\ldots$ and if the contents of ACC after this is carried out are positive $CR=5$ is set by $(SC\text{-}5)=(CR=4)\cdot F_4\cdot F_3\cdot F_5\cdot(CA=0)+\ldots$ and, as the result 1, as the quotient, is added to the least significant figure of ACC.

As the method of the above mentioned addition the carry (SCA) in ADD is set at 1 under the following conditions, namely, $$(SCA)=F_3\cdot(CR=5)\cdot F_4\cdot(TD0)\cdot(TB1)+\ldots$$

and 1 is counted on the least significant figure of ACC by turning round ACC by generating SP–A by means of $S\text{-}14=(CR=5)+\ldots$. Thereafter $CR=4$ is set by $$SC\text{-}4=(CR=5)\cdot F_3\cdot TD10\cdot TB1+\ldots$$

to operate again ACC–R, and the operations of (15) and (16) are repeated.

In the present example, repetition is carried out for 5 times, and then $CR=4$ is set and ACC–R is carried out.

In the 6th subtraction ACC becomes smaller than 0, and therefore the same processes as (12) and (13) are followed.

(19) to (22) The same process as the operations of (12) and (18), and the partial quotient of 6 figures can be obtained, and ACC is shifted to the left by one figure ($CR=6$), and by carrying out ACC–R ($CR=4$), to start the calculation of the 7th figure of the quotient, then $ACC<0(CA=1)$ is discriminated.

(23) As the same as the operations of (12) and and (13), $ACC+R$ is processed, and when $C_3$ becomes 1 during this process, it is determined that the least significant figure is not equal to 0, and the discriminating FF·$F_7$ is not set, and it is detected that it is not possible to carry out the calculation. The reason for this is that the number of the figure of R, which is higher by one figure than the most significant figure of the quotient within ACC, is not 0 by ($F_7=0$), and consequently, when calculation is further continued, the most significant figure of the quotient is considered to be the least significant figure of the dividend, and the divisor is subtracted therefrom.

At the time when this process is finished, in the present example, there is a remainder and the figure of the quotient is at a lower position.

(24) $CR=7$ is set by $$SC\text{-}7=\overline{F}_7\cdot F_3\cdot\overline{F}_4\cdot(CR=4)\cdot TD10+\ldots$$

and from the accumulator ACC the transmission is made to the indicating register R, and at the moment when $C_2$ is equal to 1, i.e., the whole figures of the quotient enter the indicating register R, the discriminating FF·$F_8$ is set by $$SF_8=(CR=7)\cdot F_3F_1\cdot(C_3=0)\cdot TB8+\ldots$$

and the transmission gate G–4 from ACC, which has been opened by $S\text{-}4=(CR=7)\cdot F_3\cdot\overline{F}_8$ in the process of $CR=7$, is closed by the signal of $F_8$, and at the same time the gate G–5 is opened by $$S\text{-}5=(CR=7)\cdot F_8+\ldots$$

(25) Further when the transmission has progressed and the whole figure shift is carried out, the quotient which is the result of the calculation, is sent from the indicating register, and the decimal point is sent from the counter $C_1$ to the indicating means, and as a result thereof .0503030 is indicated and the remainder is memorized in ACC, and thereafter all the memories other than ACC and the counter $C_1$ are reset, and the calculation is terminated.

When the remainder is required, by the transmission keys [T] and [OS], CR is made to be 7, and at the same time $F_1$ is set, and the number is sent from ACC to R in the same manner as in the cycle of indication.

VII. Predetermined number multiplication

As mentioned above, in multiplication, in accordance with the calculation system of the present calculation, the number of the multiplicand is memorized in ACC when calculation is completed and therefore the multiplicand is transmitted to the indicating register at $CR=7$, i.e., under the condition of $$(SC\text{-}7)=(\text{key } [T])\cdot OS$$

by pushing the transmission key [T]. In this case, the result of multiplication in the indicating register is cleared because S-6 is zero.

Therefore, by pushing the key [×] immediately thereafter, the number is again used as the multiplicand and therefore in the case wherein the same number is repeatedly multiplied, i.e., $A\times B_1=C_1$, $A\times B_2=C_2$, . . ., once a predetermined number is set as the multiplicand it is possible to carry out the multiplication of the same number by using the transmission key [T].

VIII. In the complementing-decomplementing converting operation of III, the binary counter $C_4$ is used, and when the complement conversion is carried out once, the counter $C_4$ is set under the condition of (key [—·=])$\cdot OS\cdot(CR=0)$, and the state thereof is indicated by the indicator. When the calculation is continued thereafter, it is possible to prevent an erroneous operation such as to continue the calculation without converting into the original complement number.

IX. In multiplication operation IV, if an automatic clear key is provided, by locking this key, when the multiplication key [×] is pushed, (as in the example of IV) by clearing the contents of the accumulator ACC and the counter $C_3$, the example for IV, i.e.

$K+A\times B$ (FIG. 24) $3.45+2.35\times 12.4=$ is turned into $A\times B$ $2.35\times 12.5=29.14$ it is possible to carry out independent multiplication without pushing the auxiliary key [C] before multiplication is carried out.

As described in the foregoing, in accordance with the present invention, an indicating register and an accumulator having the same number of figures serve as a memory device, which result in a miniature construction, and these two shift registers together with two or three of the counters enable all of the computing processes. Especially, division, multiplication of a predetermined digit, multiplication-addition and multiplication subtraction are handled in an automatic decimal point system; and endless quotient division and number complement conversion are processed without any deficiency in practical point of view. Furthermore, the control system is very simplified so that the present invention contributes to the industry as a desk type or transferrable type computer.

It is to be noted that, the positions and orders of the registration of operand and the digits to be operated in the two operation shift registers should not be limited to the ones as illustrated in the above embodiment, as also the operation of counters are not limited to that disclosed in the foregoing and it may be possible to impart more than two roles to one counter.

What is claimed is:

1. In a computer for performing four fundamental rules of arithmetic, first and second shift registers for memorizing binary-coded operands, each register being capable of registering both operands in such a manner that the sum of the numbers of figures of both operands is as much as the maximum figure capacity of the register, the second register being an accumulator connected to an addition-subtraction circuit, the addition-subtraction circuit being further connected to an order register for memorizing a processing order so as to convert the addition-subtraction circuit selectively to addition or subtraction operation; means for registering, during a first computing step, an operand in at least one of said shift registers; at least one counter provided cooperatively with said first and second shift registers for shifting the operand memorized in said at least one shift register to a preparatory position in accordance with a processing order memorized in the order register during a second computing step; transfer means connected to said at least one counter for detecting the content of the counter and for transferring the operand memorized in the first shift register to the second shift register through the aid of the addition-subtraction circuit in accordance with a processing order in the order register during a third computing step; and control circuit means connected to said first and second shift registers, order register, counter and transfer means for causing the executing of said first through third steps and for accumulating the computed result in the second register.

2. In a computer for performing addition-subtraction with automatic decimal point adjustment, a first shift register for memorizing a first binary-coded operand and a second register for memorizing a second binary-coded operand, each register being capable of registering both operands in such a manner that the sum of the numbers of figures of both operands is as much as the maximum figure capacity of the register, the second register being an accumulator connected to an addition-subtraction circuit, the addition-subtraction circuit being further connected to an order register for memorizing a processing order so as to convert the addition-subtraction circuit selectively to addition or subtraction operation; means for registering, during a first computing step, the operands in said first and second registers; a first counter for counting, during said first step, the figures below the decimal point of the operand registered in the first register and a second counter for counting the figures below the decimal point of the operand registered in the second register and for counting the difference between the figures counted by these two counters, the second counter cooperating with at least one of the first and second registers for applying shift signals thereto until the content of the second counter becomes zero, during a second computing step, so as to cause the positions of the decimal points of said first and second operands registered in the first and second registers, respectively, to coincide; transfer means connected to the second counter for detecting the content thereof and, during a third computing step, transferring the first operand in the first register to the second register through the aid of the addition-subtraction circuit; and control circuit means connected to said first register, second register, second counter, and transfer means for causing the executing of the first through third computing steps and for accumulating the computed result in the second register.

3. In a computer for performing multiplication, a first shift register for registering in series first and second binary-coded operands for multiplication and serving as a memory device, said register being provided with re-circulating means; a second register connected to the first shift register through an addition-subtraction circuit, each register being capable of registering both operands in such a manner that the sum of the numbers of figures of both operands is as much as the maximum figure capacity of the register, the second register being an accumulating register and serving as a memory device; and the addition-subtraction circuit being connected to an order register for memorizing a processing order so as to convert the addition-subtraction circuit to addition operation; means for registering, during a first computing step, the first and second operands in series in the first register; a first counter for counting the total number of figures of the second operand registered in the first register; means connected to the first counter for judging the content of the first counter so as to apply shift signals to the first register to separate the first and second operands series registered therein, during a second computing step; a second counter for counting the total number of figures of the separated second operand in the first register; transfer means to repetitively transfer the first operand in the first register to the second register through the addition-subtraction circuit during a third computing step; subtraction means connected to the first register for subtracting, during the third step, 1 from the second operand in the first register every time the first operand is transferred; means connected to the first register for judging, during the third step, when the end figure of the second operand in the first register is 0, for supplying a stop signal to said transfer means and shift the first operand in the first register one place, and for subtracting one from the second counter; and control circuit means for causing the executing of the first through third step and accumulating in the second register the product of the first and second operands.

4. A computer according to claim 3, further characterized in that the numerical representation in the first shift register is shifted while the content of the second counter is transferred to the first counter, and at the completion of the process, the content of the first counter is discriminated while the numerical representation in the second shift register is returned to its original position, whereby multiplication of a predetermined numerical representation is provided.

5. A computer according to claim 3, further characterized in that a means for clearing the content of the second register before the multiplication process starts is provided so that automatic clear multiplication is provided.

6. A computer according to claim 3, further characterized in that a third, decimal point counter is provided so that, when multiplier and multiplicand are registered in the normal arrangement in the first shift register, numbers of figures below the decimal points of the multiplier and the multiplicand, respectively, are counted and memorized, and by predetermining position of the decimal point of the product, multiplication is provided with automatic decimal point handling.

7. A computer according to claim 3, further characterized in that means for indicating the content of the first counter is provided, whereby the border between the multiplier and multiplicand is indicated.

8. A computer according to claim 3, further comprising means for processing the decimal point of multiplication and including a third counter for counting the figures below the decimal points of the first and second operands registered in the first register and giving the position of the decimal point of the product accumulated in the second register.

9. In a computer for performing division, a first shift register for registering the divisor operand and a second shift register for registering the dividend operand, each register being capable of registering both operands in such a manner that the sum of the numbers of figures of both operands is as much as the maximum figure capacity of the register and serving as a memory device, and the second register being an accumulating register connected to an addition-subtraction circuit, the addition-subtraction circuit being connected to an order register for memorizing a processing order and converting the addition-subtraction circuit to subtraction operation; means for registering, during a first computing step the operands in said first and second registers; transfer means connected to the second register during a second computing step and to the first register through the addition-subtraction circuit for repetitively subtracting the divisor from the dividend in the second register; means connected to said transfer means for counting, during said second step, the number of transfers, to register the partial quotient; means for counting, during the second step, the number of figures of said partial quotient; means connected to the last-mentioned means for observing the number of figures between the most significant figure of said partial quotient and the least significant figure of the divisor and stopping the second step of computing when the difference becomes zero; and control circuit means for causing the executing of said computing steps and accumulating in the second register the quotient and remainder.

10. A computer as defined in claim 9, further comprising means for judging the subtraction of the divisor from the dividend in the second register by the transfer means and for converting the addition-subtraction circuit to addition operation so as to add the divisor to the dividend in the second register and to send a 1 subtraction signal to the first-mentioned counting means simultaneously with the application of a 1 figure shift signal to the second register.

11. A computer as defined in claim 9, further comprising a digit indicating means connected to the first register, and second transfer means for transferring at least one of the quotient and remainder obtained in the second register upon the completion of the second computing step.

12. In a computer for performing division, with automatic decimal point adjustment, a first shift register for registering the divisor operand and a second shift register for registering the dividend operand, each register being capable of registering both operands in such a manner that the sum of the numbers of figures of both operands is as much as the maximum figure capacity of the register and serving as a memory device, the second register being an accumulating register connected to an addition-subtraction circuit, the addition-subtraction circuit being connected to an order register for memorizing a processing order and converting the addition-subtraction circuit to subtraction operation, means for registering, during a first computing step, the operands in said first and second registers; a first counter for counting, during the first step, the difference between the number of figures above the decimal point of the divisor registered in the first register and the number of figures above the decimal point of the dividend registered in the second and defining the position of the decimal point of the quotient upon the completion of the computing steps; transfer means connected to the second register, during a second computing step, and to the first register through the addition-subsbtraction circuit for repetitively subtracting the divisor from the dividend in the second register; means connected to said transfer means for counting, during said second computing step, the number of transfers, to register the partial quotient; means for counting, during said second step, the number of figures of said partial quotient; means connected to the last-mentioned means for observing the number of figures between the most significant figure of said partial quotient and the last significant figure of the divisor and for stopping the second computing step when the difference becomes zero; and control circuit means for causing the executing of said computing steps and for accumulating in the second register the quotient and remainder and for defining the position of the decimal point of the quotient.

13. A computer as defined in claim 12, further comprising means for judging the subtraction of the divisor from the dividend in the second register by the transfer means and for converting the addition-subtraction circuit to addition operation so as to add the divisor to the dividend in the second register and to send a 1 subtraction signal to the first-mentioned counting means simultaneously with the application of a 1 figure shift signal to the second register.

14. A computer as defined in claim 13, further comprising indicating means connected to the first register for indicating the number registered in the first register and having decimal point indicating means; the first counter being connected to said decimal point indicating means at the completion of the second step.

15. In a computer for performing four fundamental rules of arithmetic, then providing complement conversion of the computed result, first and second registers for registering binary-coded operands during a first computing step, each register being capable of registering both operands in such a manner that the sum of the numbers of figures of both operands is as much as the maximum figure capacity of the register and serving as a memory device, and the second register being an accumulating register connected to an addition-subtraction circuit, which is connected to an order register for memorizing a processing order, so as to convert the addition-subtraction circuit selectively to addition or subtraction operation; at least one counter cooperatively provided with said first and second registers for shifting, during a second computing step, the operand registered in at least one of the registers to a preparatory position in accordance with the processing order memorized in the order register; first transfer means connected to said counter to detect the content thereof, during a third computing step, for transferring the operand in the first register through said addition-subtraction circuit in accordance with the processing order in the order register; means for clearing the content of the second register in cooperation with second transfer means; third transfer means for converting the computed result in the first register to a complement to be transferred to the second register; and control circuit means for causing the executing of said computing steps and accumulating the computed result converted into the complement in the second register.

16. A computer according to claim 15, further comprising a binary counter for counting the frequency of complement conversion and means for indicating the content of the binary counter, whereby it is indicated that the numerical representation is a number or its complement.

References Cited

UNITED STATES PATENTS

| | | | |
|---|---|---|---|
| 3,037,701 | 6/1962 | Sierra | 235—159 |
| 3,315,069 | 4/1967 | Böhm | 235—156 |
| 3,375,356 | 3/1968 | Scuitto et al. | 235—159 |
| 3,385,960 | 5/1968 | Buu | 235—159 |

MALCOLM A. MORRISON, Primary Examiner

R. S. DILDINE, Jr., Assistant Examiner

U.S. Cl. X.R.

235—159, 174